US010992738B1

(12) United States Patent
Burney

(10) Patent No.: US 10,992,738 B1
(45) Date of Patent: Apr. 27, 2021

(54) TRANSMITTING INTERACTIVE CONTENT FOR RENDERING BY AN APPLICATION

(71) Applicant: Cardlytics, Inc., Atlanta, GA (US)

(72) Inventor: Kwajalyn Chamar Burney, Atlanta, GA (US)

(73) Assignee: CARDLYTICS, INC., Atlanta, GA (US)

( * ) Notice: Subject to any disclaimer, the term of this patent is extended or adjusted under 35 U.S.C. 154(b) by 0 days.

(21) Appl. No.: 16/731,797

(22) Filed: Dec. 31, 2019

(51) Int. Cl.
| G06F 15/16 | (2006.01) |
| H04L 29/08 | (2006.01) |
| G06Q 20/12 | (2012.01) |
| G06F 21/10 | (2013.01) |
| H04L 29/06 | (2006.01) |

(52) U.S. Cl.
CPC .............. *H04L 67/10* (2013.01); *G06F 21/10* (2013.01); *G06Q 20/127* (2013.01); *H04L 63/0218* (2013.01); *H04L 67/18* (2013.01); *H04L 67/2804* (2013.01); *G06F 2221/0704* (2013.01); *G06Q 2220/18* (2013.01)

(58) Field of Classification Search
CPC ..... H04L 67/10; H04L 63/0218; H04L 67/18; H04L 67/2804; H04L 67/22; H04L 67/306; G06Q 20/127; G06Q 2220/18; G06Q 30/0224; G06Q 30/0255; G06Q 30/0259; G06Q 30/0261; G06Q 30/0269; G06Q 30/0236; G06F 21/10; G06F 2221/0704; H04W 4/02; H04W 4/021; H04W 4/025
USPC ....... 709/201, 224; 455/456.1, 456.3, 456.6; 705/14.25, 14.36, 14.39, 14.53, 14.57, 705/14.58, 14.66, 14.73
See application file for complete search history.

(56) References Cited

U.S. PATENT DOCUMENTS

| 4,723,212 A | 2/1988 | Mindrum et al. |
| 4,910,672 A | 3/1990 | Off et al. |
| 5,173,851 A | 12/1992 | Off et al. |

(Continued)

FOREIGN PATENT DOCUMENTS

| EP | 1259947 B1 | 10/2004 |
| EP | 1257992 B1 | 2/2007 |

(Continued)

OTHER PUBLICATIONS

Fitzgerald, U.S. Bank Launches Merchant-Funded Rewards Program witt1 FreeMonee, http://www.freemonee.com/wp-contentluploadsiPaymentsSource_4_-12_2012.pdf, Apr. 12, 2012, 2 pgs.

(Continued)

*Primary Examiner* — Johnny B Aguiar
(74) *Attorney, Agent, or Firm* — Morris, Manning & Martin, LLP; Bryan D. Stewart; Adam J. Thompson

(57) ABSTRACT

Provided herein are systems and processes for transmitting interactive content to an application and causing the interactive content to be rendered on a display of the application. In at least one embodiment, the system is configured to analyze mapping metadata based on deployment criteria and cause a content element to be rendered on a display when the mapping metadata satisfies the deployment criteria. A content element may be a permitted content element from a plurality of permissible content elements. The deployment criteria includes temporal criteria, mapping criteria, and/or other criteria described herein.

20 Claims, 6 Drawing Sheets

(56) References Cited

U.S. PATENT DOCUMENTS

| | | | |
|---|---|---|---|
| 5,220,501 A | 6/1993 | Lawlor et al. |
| 5,612,868 A | 3/1997 | Off et al. |
| 5,689,100 A | 11/1997 | Carrithers et al. |
| 5,832,457 A | 11/1998 | O'Brien et al. |
| 5,870,724 A | 2/1999 | Lawlor et al. |
| 5,884,035 A | 3/1999 | Butman et al. |
| 5,892,827 A | 4/1999 | Beach et al. |
| 5,915,007 A | 6/1999 | Klapka |
| 5,918,014 A | 6/1999 | Robinson |
| 5,926,795 A | 7/1999 | Williams |
| 6,026,370 A | 2/2000 | Jermyn |
| 6,067,524 A | 5/2000 | Byerly et al. |
| 6,202,054 B1 | 3/2001 | Lawlor et al. |
| 6,216,129 B1 | 4/2001 | Eldering |
| 6,240,394 B1 | 5/2001 | Uecker et al. |
| 6,278,979 B1 | 8/2001 | Williams |
| 6,282,516 B1 | 8/2001 | Giuliani |
| 6,304,849 B1 | 10/2001 | Decker et al. |
| 6,307,958 B1 | 10/2001 | Deaton et al. |
| 6,321,210 B1 | 11/2001 | O'Brien et al. |
| 6,327,574 B1 | 12/2001 | Kramer et al. |
| 6,332,126 B1 | 12/2001 | Peirce et al. |
| 6,334,108 B1 | 12/2001 | Deaton et al. |
| 6,351,735 B1 | 2/2002 | Deaton et al. |
| 6,377,935 B1 | 4/2002 | Deaton et al. |
| 6,424,949 B1 | 7/2002 | Deaton et al. |
| 6,424,951 B1 | 7/2002 | Shurling et al. |
| 6,434,747 B1 | 8/2002 | Khoo et al. |
| 6,484,146 B2 | 11/2002 | Day et al. |
| 6,560,578 B2 | 5/2003 | Eldering |
| 6,604,085 B1 | 8/2003 | Kolls |
| 6,795,809 B2 | 9/2004 | O'Brien et al. |
| 6,885,994 B1 | 4/2005 | Scroggie et al. |
| 7,024,374 B1 | 4/2006 | Day et al. |
| 7,058,591 B2 | 6/2006 | Giuliani et al. |
| 7,076,458 B2 | 7/2006 | Lawlor et al. |
| 7,136,875 B2 | 11/2006 | Anderson et al. |
| 7,228,285 B2 | 6/2007 | Hull et al. |
| 7,292,999 B2 | 11/2007 | Hobson et al. |
| 7,309,001 B2 | 12/2007 | Banfield et al. |
| 7,310,609 B2 | 12/2007 | Middleton, III et al. |
| 7,386,485 B1 | 6/2008 | Mussman et al. |
| 7,392,224 B1 | 6/2008 | Bauer et al. |
| 7,415,426 B2 | 8/2008 | Williams et al. |
| 7,430,521 B2 | 9/2008 | Walker et al. |
| 7,580,856 B1* | 8/2009 | Pliha ..................... G06Q 20/10 235/380 |
| 7,693,790 B2 | 4/2010 | Lawlor et al. |
| 8,160,921 B2 | 4/2012 | Gebhardt et al. |
| 8,302,169 B1 | 10/2012 | Presotto et al. |
| 8,479,978 B1 | 7/2013 | Miller et al. |
| 8,527,421 B2 | 9/2013 | Gailey et al. |
| 8,589,225 B2 | 11/2013 | Cohagan et al. |
| 8,590,022 B2 | 11/2013 | Faryna |
| 8,606,865 B2 | 12/2013 | Layson, Jr. |
| 8,688,579 B1 | 4/2014 | Ethington et al. |
| 2002/0069115 A1 | 6/2002 | Fitzpatrick |
| 2002/0078147 A1 | 6/2002 | Bouthers et al. |
| 2002/0091566 A1 | 7/2002 | Siegel |
| 2002/0123928 A1 | 9/2002 | Eldering et al. |
| 2002/0147639 A1 | 10/2002 | Williams et al. |
| 2003/0033199 A1 | 2/2003 | Coleman |
| 2003/0040959 A1 | 2/2003 | Fei et al. |
| 2003/0055723 A1 | 3/2003 | English |
| 2003/0069808 A1 | 4/2003 | Cardno |
| 2003/0088466 A1 | 5/2003 | Fitzpatrick |
| 2003/0101454 A1 | 5/2003 | Ozer et al. |
| 2003/0158844 A1 | 8/2003 | Kramer et al. |
| 2004/0111491 A1 | 6/2004 | Raja et al. |
| 2004/0122736 A1 | 6/2004 | Strock et al. |
| 2004/0159700 A1 | 8/2004 | Khan et al. |
| 2006/0122921 A1* | 6/2006 | Comerford ........ G06Q 30/0235 705/35 |
| 2006/0212350 A1 | 9/2006 | Ellis et al. |
| 2007/0027754 A1 | 2/2007 | Collins et al. |
| 2007/0027758 A1 | 2/2007 | Collins et al. |
| 2007/0219865 A1 | 9/2007 | Leining |
| 2007/0265948 A1 | 11/2007 | Maiorino et al. |
| 2008/0052153 A1 | 2/2008 | Cook |
| 2008/0086365 A1 | 4/2008 | Zollino et al. |
| 2008/0091535 A1 | 4/2008 | Heiser et al. |
| 2008/0103887 A1 | 5/2008 | Oldham et al. |
| 2008/0205655 A1 | 8/2008 | Wilkins et al. |
| 2008/0021986 A1 | 9/2008 | Soicher et al. |
| 2009/0006212 A1 | 1/2009 | Krajicek et al. |
| 2009/0037264 A1* | 2/2009 | Del Favero ............ G06Q 30/02 705/14.21 |
| 2009/0048978 A1 | 2/2009 | Ginter et al. |
| 2009/0099931 A1 | 4/2009 | Aaltonen et al. |
| 2009/0106368 A1 | 4/2009 | Padveen et al. |
| 2009/0119769 A1 | 5/2009 | Ross et al. |
| 2009/0199094 A1 | 8/2009 | Jurgens et al. |
| 2009/0234708 A1 | 9/2009 | Heiser, II et al. |
| 2009/0287562 A1 | 11/2009 | Bosch et al. |
| 2009/0300723 A1 | 12/2009 | Nemoy et al. |
| 2009/0327151 A1* | 12/2009 | Carlson .................. G06Q 30/02 705/80 |
| 2010/0106596 A1 | 4/2010 | Grimes |
| 2010/0332260 A1 | 12/2010 | Kassas |
| 2011/0035594 A1 | 2/2011 | Fox |
| 2011/0137717 A1 | 6/2011 | Reuthe et al. |
| 2011/0161150 A1 | 6/2011 | Steffens et al. |
| 2011/0238469 A1 | 9/2011 | Gershman et al. |
| 2011/0288918 A1 | 11/2011 | Cervenka et al. |
| 2012/0150611 A1 | 6/2012 | Isaacson et al. |
| 2012/0150641 A1 | 6/2012 | Dobbs et al. |
| 2012/0150746 A1 | 6/2012 | Graham |
| 2012/0191525 A1 | 7/2012 | Singh et al. |
| 2012/0226530 A1* | 9/2012 | Gebb .................. G06Q 30/0234 705/14.1 |
| 2012/0331073 A1 | 12/2012 | Williams |
| 2013/0060631 A1 | 3/2013 | Corson et al. |
| 2013/0124315 A1 | 5/2013 | Doughty et al. |
| 2013/0253967 A1 | 9/2013 | Single |
| 2013/0325582 A1 | 12/2013 | Drozd et al. |
| 2014/0067571 A1 | 3/2014 | Fricke et al. |
| 2015/0332338 A1* | 11/2015 | Chelko ............... G06F 21/6245 705/51 |
| 2017/0094042 A1 | 3/2017 | Dagit, III |
| 2018/0247330 A1* | 8/2018 | Duerr ..................... H04L 67/18 |
| 2018/0285920 A1* | 10/2018 | Loomis .............. G06Q 30/0207 |
| 2018/0365733 A1 | 12/2018 | Christensen et al. |

FOREIGN PATENT DOCUMENTS

| | | |
|---|---|---|
| TW | 201511513 A | 3/2015 |
| WO | 1999050775 | 10/1999 |
| WO | 2001022374 | 3/2001 |
| WO | 2010016778 | 2/2010 |
| WO | 2015175033 A1 | 11/2015 |

OTHER PUBLICATIONS

Dowling, et al., Do Customer Loyalty Programs Really Work?, http:liwww.royalloyalties.com/case_study.pdf, 1997, pp. 1-24 (28 pgs. total), Centre for Corporate Change—Australian Graduate School of Management, Australlia.

Wibowo, et. al., Loyalty Program Scheme for Anonymous Payment Systems, http://ittf.vlsm.org/bebas/v01/OnnoWPurbo/contrib/aplikasi/e-commerce/loyalty-program-scheme-for-anonymous-payment-systems-1999.pdf, 2000, pp. 1-2, National University of Singapore, Singapore.

International Search Report and Written Opinion dated Jun. 8, 2015 for international patent application No. PCT/US15/15008.

International Search Report and Written Opinion dated Mar. 17, 2020 for international patent application No. PCT/US19/69104.

\* cited by examiner

TRANSMITTING INTERACTIVE CONTENT FOR RENDERING BY AN APPLICATION

CROSS REFERENCE TO RELATED APPLICATIONS

This application is related to:

U.S. patent application Ser. No. 14/617,112, filed Feb. 9, 2015, entitled "SYSTEM AND APPARATUS FOR IDENTIFIER MATCHING AND MANAGEMENT"; and U.S. patent application Ser. No. 12/486,131, filed Jun. 17, 2009, entitled "SYSTEM AND METHODS FOR DELIVERING TARGETED MARKETING OFFERS TO CONSUMERS VIA AN ONLINE PORTAL,"

each of which are incorporated herein by reference as if set forth in their entireties.

BACKGROUND

A long-felt problem in transmission of interactive content is how to quickly and automatically incorporate, access, and/or view permitted content elements within a software application, particularly in instances where information describing the permitted content elements originates outside of the software application. Computing devices tend to require movement between at least two distinct software applications or systems to incorporate permitted content elements into a software application. For example, a device operator may be associated in an external system with a set of permitted content elements, and the device operator may desire to view or access the set of permitted content elements within a software application. However, because the set of permitted content elements is not generated within the software application, the device operator may be required to perform one or more intermediary steps, such as, for example, manually inputting permitted content elements into the software application in a sequential manner.

As can be appreciated, the one or more intermediary steps undesirably introduce additional time, expense, and complexity into the process of viewing and accessing permitted content elements within software applications. Furthermore, because permitted content elements may be manually input to a software application by a device operator, a chance of element omission is undesirably increased, because the operator may not recollect all permitted content elements or may erroneously input one or more content elements.

The inability of previous approaches to automatically integrate permitted content elements into software applications can undesirably preclude a device operator from accessing the permitted content elements. Therefore, there is a long-felt but unmet need for a system or method that automatically integrates permitted content elements into software applications.

BRIEF SUMMARY OF THE DISCLOSURE

Briefly described, and according to one embodiment, aspects of the present disclosure generally relate to systems and processes for transmitting interactive content.

According to a first aspect, a process for transmitting interactive content including: A) transmitting content to a computing device associated with particular data, the content including a call to a beacon service and a secure identifier associated with the particular data; B) generating an association between the secure identifier and at least one public identifier based on the beacon service; C) identifying a subset of a plurality of permissible content elements based on a spend history corresponding to the particular data of an external computing system, wherein each of the plurality of permissible content elements are associated with a respective entity and each respective entity includes a plurality of respective locations; D) activating at least one permissible content element of the subset of the plurality of permissible content elements and storing the activated at least one permissible content element as at least one permitted content element; E) generating a plurality of deployment criteria associated with the at least one permitted content element based on the plurality of respective locations for the respective entity corresponding to the at least one permitted content element; F) receiving mapping metadata corresponding to an application, the mapping metadata including the at least one public identifier, the mapping metadata including at least one of: an origination location, a plurality of locations along a pathway, and a terminal location; G) determining whether the plurality of deployment criteria are satisfied for the at least one permitted content element based on the mapping metadata; and H) in response to the plurality of deployment criteria being satisfied, causing the at least one permitted content element to be rendered on a display of the application at a position corresponding to one of the plurality of respective locations.

According to a second aspect, the process for transmitting interactive content of the first aspect or any other aspect, wherein causing the at least one permitted content element to be rendered on the display of the application includes causing at least one media object associated with the at least one permitted content element to be rendered on the display.

According to a third aspect, the process for transmitting interactive content of the first aspect or any other aspect, further including: A) receiving, via the application, an indication that the at least one permitted content element is to be rendered on the display; and B) customizing a rendering of the at least one permitted content element.

According to a fourth aspect, the process for transmitting interactive content of the first aspect or any other aspect, wherein the steps of receiving mapping metadata, determining whether the plurality of deployment criteria are satisfied, and causing the at least one permitted content element to be rendered on the display of the application are performed by the application.

According to a fifth aspect, the process for transmitting interactive content of the fourth aspect or any other aspect, further including populating the application with the at least one permitted content element and the plurality of deployment criteria.

According to a sixth aspect, the process for transmitting interactive content of the first aspect or any other aspect, wherein the steps of receiving mapping metadata, determining whether the plurality of deployment criteria are satisfied, and causing the at least one permitted content element to be rendered on the display of the application are performed by an interchange platform and the process for transmitting interactive content further includes populating the interchange platform with the at least one permitted content element and the plurality of deployment criteria.

According to a seventh aspect, the process for transmitting interactive content of the first aspect or any other aspect, wherein the at least one of: an origination location, a plurality of locations along a pathway, and a terminating location includes at least one location associated with a global location system.

According to an eighth aspect, the process for transmitting interactive content of the first aspect or any other aspect, wherein the mapping metadata is received from an interchange platform and causes the at least one permitted content element to be rendered on the display includes: A) determining a proffer amount based on metadata associated with the at least one permitted content element; B) in response to receiving the metadata, transmitting a proffer for the proffer amount to the interchange platform.

According to a ninth aspect, the process for transmitting interactive content of the first aspect or any other aspect, wherein determining whether the plurality of deployment criteria are satisfied includes determining whether at least one of the plurality respective locations for the at least one permitted content element is within a predetermined separation length from the pathway.

According to a tenth aspect, the process for transmitting interactive content of the first aspect or any other aspect, wherein determining whether the plurality of deployment criteria are satisfied includes determining whether at least one of the plurality respective locations for the at least one permitted content element is within a predetermined detour time from the pathway.

According to an eleventh aspect, the process for transmitting interactive content of the first aspect or any other aspect, wherein the external computing system and the application are controlled by a single operator.

According to a twelfth aspect, the process for transmitting interactive content of the first aspect, wherein the computing device executes the application.

According to a thirteenth aspect, a computer system including: A) a first portion of a distributed architecture coupled for intercommunication to an external computing system and located behind a firewall, wherein the first portion is configured to: 1) transmit content to a computing device associated with particular data, the content including a call to a beacon service and the secure identifier; 2) identify a subset of a plurality of permissible content elements based on a spend history corresponding to the particular data of the external computing system, wherein each of the plurality of permissible content elements are associated with a respective entity and each respective entity includes a plurality of respective locations; and 3) activate at least one permissible content element of the subset of the plurality of permissible content elements and storing the activated at least one permissible content element as at least one permitted content element; and B) a second portion of the distributed architecture located outside of the firewall coupled for intercommunication to the first portion of the distributed architecture, wherein the second portion is configured to: 1) generate an association between the secure identifier and at least one public identifier based on the beacon service; 2) generate a plurality of deployment criteria associated with the at least one permitted content element based on the plurality of respective locations for the respective entity corresponding to the at least one permitted content element; 3) receive mapping metadata from an application including the at least one public identifier, the mapping metadata including at least one of: an origination location, a plurality of locations along a pathway, and a terminating location; 4) verify that the plurality of deployment criteria are satisfied for the at least one permitted content element based on the mapping metadata; and 5) in response to the plurality of deployment criteria being satisfied, cause the at least one permitted content element to be rendered on a display of the application at a position corresponding to one of the plurality of respective locations.

According to a fourteenth aspect, the computer system of the thirteenth aspect or any other aspect, wherein the second portion is further configured to verify that the plurality of deployment criteria are satisfied for the at least one permitted content element further based on correlating a current time to scheduling data of the respective entity corresponding to the at least one permitted content element.

According to a fifteenth aspect, the computer system of the thirteenth aspect or any other aspect, wherein the plurality of deployment criteria includes at least one of: a time span, a set of particular days, a geofence, and a weather condition.

According to a sixteenth aspect, a system for transmitting interactive content including: A) a data store including data describing: 1) a plurality of permitted content elements associated with a secure identifier, wherein the secured identifier corresponds to particular data; and 2) a respective entity for each of the plurality of permitted content elements, wherein each respective entity includes a plurality of respective locations; and B) at least one computing device in communication with the data store, the at least one computing device being configured to: 1) generate an association between the secure identifier and at least one public identifier; 2) generate a plurality of deployment criteria associated with the plurality of permitted content elements based on the plurality of respective locations for the respective entity; 3) receive mapping metadata and the at least one public identifier, the mapping metadata including at least one of: an origination location, a plurality of locations along a pathway, and a terminating location; 4) identify the plurality of permitted content elements based on the association between the secured identifier and the at least one public identifier; 5) in response to identifying the plurality of permitted content elements, verify that the plurality of deployment criteria are satisfied for at least one of the plurality of permitted content elements based on the mapping metadata; and 6) cause the at least one of the plurality of permitted content elements to be rendered on a display at a position corresponding to one of the plurality of respective locations.

According to a seventeenth aspect, the system for transmitting interactive content of the sixteenth aspect or any other aspect, wherein the at least one computing device is further configured to: A) verify that the at least one of the plurality of permitted content elements was utilized; and B) in response to verifying that the at least one of the plurality of permitted content elements was utilized, adjust at least one of the plurality of criteria.

According to an eighteenth aspect, the system for transmitting interactive content of the sixteenth aspect or any other aspect, wherein the at least one computing device is further configured to: A) identify an article associated with one of the plurality of permitted content elements; and B) verify that the article is available at a particular one of the plurality of respective locations from the respective entity associated with the one of the plurality of permitted content elements; and cause the at least one of the plurality of permitted content elements to be rendered on the display based on verifying that the article is available.

According to a nineteenth aspect, the system for transmitting interactive content of the sixteenth aspect or any other aspect, wherein the at least one computing device is further configured to: A) generate a communication corresponding to the data; and B) transform media corresponding to the at least one of the plurality of permitted content elements to be rendered by adding the communication to the media.

According to a twentieth aspect, the system for transmitting interactive content of sixteenth aspect or any other aspect, wherein the at least one computing device is further configured to verify that the plurality of deployment criteria are satisfied by determining whether at least one of the plurality respective locations is within a predetermined radius from the origination location.

These and other aspects, features, and benefits of the claimed systems and processes will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
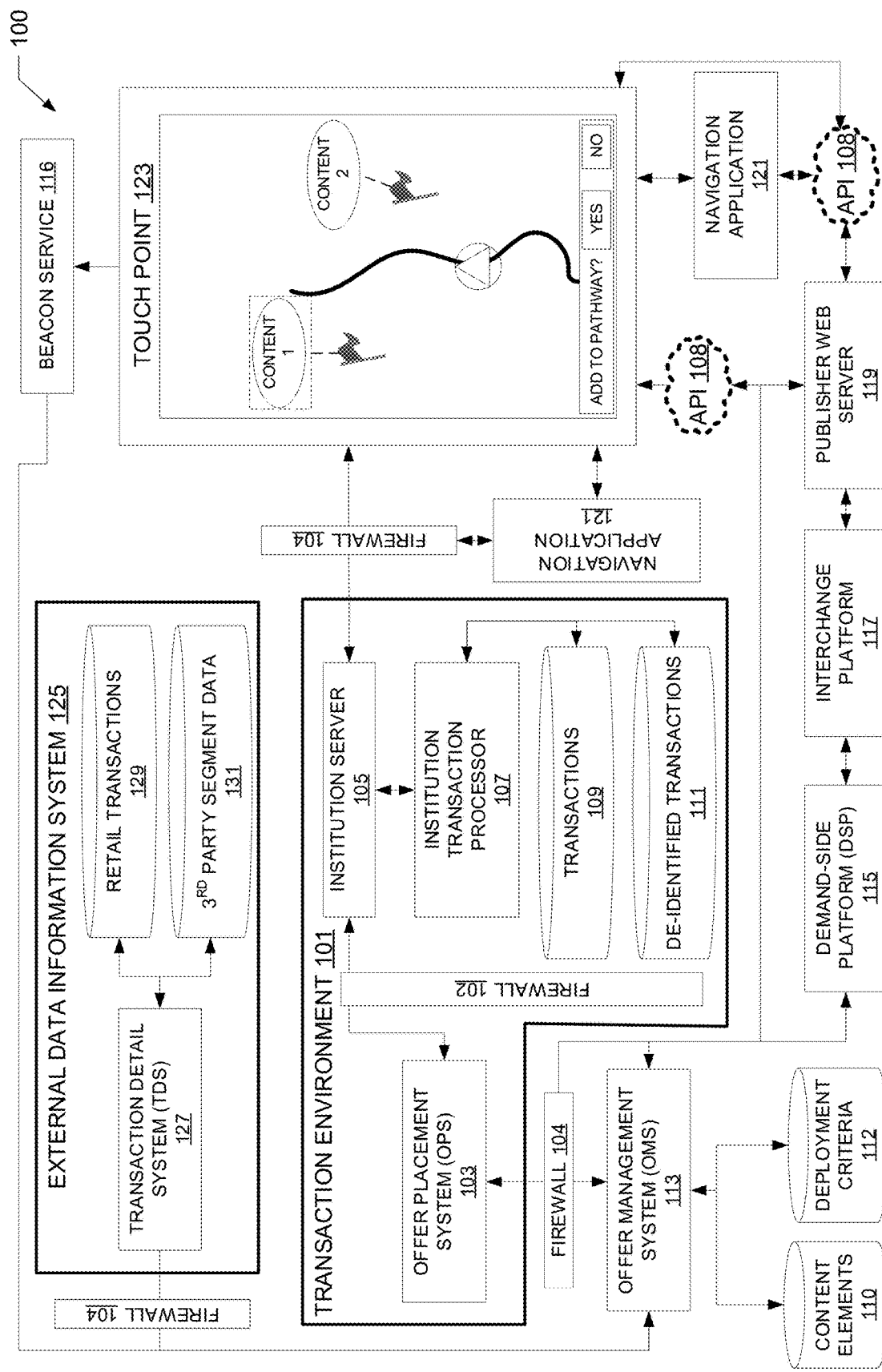
FIG. 1 illustrates an exemplary system for transmitting interactive content according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and processes for transmitting interactive content. According to one embodiment, the present systems and processes allow for automatic display of permitted content elements in a navigation application running on a computing device (referred to herein as a "Touch Point"), the permitted content elements corresponding to a spend history associated with a user of the computing device.

As used herein, "content elements" may generally refer to electronic offers, promotions, advertisements, or awards for goods and/or services.

As used herein, "permissible content elements" may generally refer to content elements that can be activated, permitted, and/or selected, for example, by inputs to a Touch Point (as described herein) or other devices rendering the permissible content elements. In one or more embodiments, permissible content elements are associated with a user (and particular data thereof, such as a user account, identifier(s), etc.) based on a spend history corresponding to transactions made by the user (e.g., transaction data). According to one embodiment, a permissible content element is associated with an entity (e.g., a business providing the good or service to which the permissible content element pertains) and at least one physical location associated with the entity (e.g., a place of business, such as a store).

As used herein, "permitted content elements" may generally refer to permissible content elements that have been activated, permitted, or selected by an input to a Touch Point or other device (or in at least one embodiment, viewed or displayed via a Touch Point). In various embodiments, a permissible content element becomes a permitted content element when a Touch Point performs one or more actions including, but not limited to: 1) displaying the permissible content element in a communication portal or navigation application initiated by the Touch Point (e.g., and, in some embodiments, in coordination with one or more other system elements) in response to a request from a user operating the Touch Point; and 2) receiving an input from a user that activates and/or selects the permissible content element displayed in the communication portal or navigation application.

The following paragraph provides an exemplary scenario of the present systems and processes, according to one embodiment of the present disclosure.

In one example, a Touch Point receives an input from a user requesting a communication portal with a transactional environment. The Touch Point transmits the request to an institution server of the transactional environment that provides the communication portal to the Touch Point, the communication portal including an instruction and a secure identifier that causes the Touch Point to call to a beacon service and provide the secure identifier and a public or device identifier stored in memory. The transactional environment, via receipt of the call at the beacon service, associates the secure identifier and the public or device identifier. The transactional environment injects permissible content elements (each associated with an entity and at least one physical location thereof) into the communication portal, the permissible content elements corresponding to a spend history associated with the user. The Touch Point renders the permissible content elements on the display and receives an input from the user that causes activation of one of the permissible content elements. Upon receipt of the activating or selecting input, the permissible content element is stored as a permitted content element (e.g., the transition being recorded at one or more content element databases in response to communications between the Touch Point and other system elements).

In the same example, the Touch Point receives an input from the user causing the Touch Point to execute a navigation application. The Touch Point executes and runs the navigation application and the system receives mapping metadata and the public identifier from the navigation application, the mapping metadata including an origination location, locations along a pathway and/or a terminal location. The system processes the mapping metadata and determines that deployment criteria associated with the permitted content element are satisfied. In response to determining the deployment criteria to be satisfied, the system causes the Touch Point to render the permitted content element (or a different content element based on the permitted content element) on a display of the navigation application. Thus, in the example described above, the system automatically deploys a permitted content element to a user's navigation application based on satisfaction of deployment criteria by mapping metadata, the permitted content element being associated with a spend history of the user and corresponding to a physical location of an entity associated with the permitted content element.

Exemplary Embodiments

Referring now to the figures, for the purposes of example and explanation of the fundamental processes and components of the disclosed systems and methods, reference is made to FIG. 1, which illustrates an exemplary system 100 for transmitting interactive content. As will be understood and appreciated, the exemplary system 100 shown in FIG. 1 represents merely one approach or embodiment of the present system, and other aspects are used according to various embodiments of the present system.

According to one embodiment, the system 100 may include an architecture of distributed computing resources divided into at least a first portion and a second portion. In various embodiments, a first portion of the system 100 includes, but is not limited to, a transaction environment 101 (including other elements described herein) and a second portion includes, but is not limited to, an offer management system (OMS) 113, demand-side platform 115, interchange platform 117, publisher web server 119, navigation application 121, Touch Point 123, and an external data information system 125 (including other elements described herein). One or more communication firewalls 104 secure and control transmissions between elements of the first and second portions.

In one or more embodiments, the system 100 includes an external computing system, such as a transaction environment 101. According to one embodiment, the external computing system includes a system that performs transactional and navigational processes. In at least one embodiment, the transaction environment 101 includes an offer placement system (OPS) 103 including at least one processor and at least one data store (e.g., including one or more databases). In various embodiments, the OPS 103 receives and aggregates de-identified transactions (e.g., organized into transaction histories) associated with a user or particular data associated with a user or user account. According to one embodiment, the particular data is data associated with one or more user accounts and/or one or more operators of Touch Points 123 and/or data associated with a patron of a particular institution in control of the transaction environment 101 (e.g., a banking institution). In one or more embodiments, the particular data includes spend data (e.g., transactional data and/or metadata) sourced from a spend history associated with a user. In at least one embodiment, the OPS 103 organizes the particular data (or associated data and metadata, such as de-identified transactions) of a plurality of users into segments according to one or more techniques described in U.S. patent application Ser. No. 12/486,131, which is incorporated herein by reference as if set forth in its entirety.

In at least one embodiment, the OPS 103 provides aggregated, de-identified transactions to an offer management system (OMS) 113. In one or more embodiments, the OMS 113 includes one more processors, servers, and data stores (e.g., including one or more databases). According to one embodiment, the OMS 113 includes one or more secured databases (e.g., in a secured data store) that contain identified data associated with each of the one or more users and/or particular data thereof. In at least one embodiment, the identified data includes, but is not limited to, phone numbers, device identifiers, email addresses, and other information associated with the one or more users or their respective particular data. In various embodiments, the one or more secured databases may be inaccessible to entities and other third-parties in communication with the OMS 113.

In at least one embodiment, the OMS 113 processes the de-identified transactions and associated particular data (according to selections received from one or more entities) from the OMS 103. In one or more embodiments, the OMS 113 performs actions including, but not limited to, identifying a subset of a plurality of permissible content elements based on a history (e.g., a spend history, such as a transaction history) corresponding to the one or more users (and/or particular data thereof, such as user profiles) associated with the transaction environment 101, each of the plurality of permissible content elements being associated with a respective entity and each respective entity including at least one respective location (e.g., a physical place of business).

In one or more embodiments, the system 100 includes one or more institution transaction processors 107 that transmit de-identified transaction data and metadata to the OPS 103. For example, the one or more institution transaction processors 107 transmit one or more histories (e.g., dataset) of de-identified transactions to the OPS 103. In the same example, the OPS 103 aggregates and transmits one or more de-identified histories to the OMS 113 that provides a campaign portal for entities (such as advertisers) to establish and manage campaigns for permissible content element deployment to a segment generated by the OMS 113 and associated with a subset of the one or more histories. Continuing the same example, the OMS 113 generates segments for targeted interactive content delivery campaigns for one or more entities by processing the one or more de-identified histories with regard to segment criteria from the one or more entities to identify a subset of the users (e.g., and particular data thereof) whose associated spend history (and/or other information) satisfy the segment criteria.

According to one embodiment, a segment includes a plurality of de-identified users or particular data (e.g., user accounts or identifiers) to which an entity desires to transmit permissible content elements. In various embodiments, as described in the incorporated U.S. patent applications, the segment is generated based on particular criteria. In one or more embodiments, each segment includes a segment identifier and data included in the segment includes a public identifier and a secure identifier. In at least one embodiment, a secure identifier is associated with a third-party institution (e.g., bank, credit union, etc.) of the user corresponding to the particular data. According to one embodiment, the third-party institution also provides and/or controls the navigation application 121. In various embodiments, the navigation application 121 is not provided by the third-party institution, but is provided by a different party, such as, for example, Google® or the company providing the OMS 113. In at least one embodiment, a public identifier is an identifying string that has been securely synched or otherwise associated with the secure identifier according to one or more techniques described herein and in U.S. patent application Ser. No. 14/617,112, which is incorporated herein by reference as if set forth in its entirety.

In various embodiments, the transaction environment 101 includes an institution server 105. In at least one embodiment, the institution server 105 is a plurality of institution servers 105, as can be appreciated. In one or more embodiments, the institution server 105 is communicably coupled to a Touch Point 123, and communications therebetween are secured and controlled by a firewall 104. According to one embodiment, the institution server 105 generates an electronic communication portal (not shown) accessible from and rendered on the Touch Point 123. In at least one embodiment, the communication portal allows the user associated with the Touch Point 123 to access and view a transaction or spend history in a secure and private manner. In at least one embodiment, the communication portal is a banking portal.

In at least one embodiment, as described in the incorporated U.S. patent applications, the system 100 injects permissible content elements into the communication portal rendered on a display of the Touch Point 123. According to one embodiment, the Touch Point 123 is operative to receive inputs from the user that cause activation, permission, or selection of one or more of the permissible content elements. In at least one embodiment, an input that causes activation or selection of a permissible content element as referred to as a permission indication. In various embodiments, a permission indication is generated by the Touch Point 123 in response to one or more of: 1) receiving input selecting a permissible content element; 2) receiving input activating a permissible content element; and 3) displaying a permissible content element in a communication portal or navigation application 121 in response receipt of a request from the user.

In various embodiments, the institution server 105 receives and transmits permission indications for permissible content elements to the OPS 103 and/or OMS 113 (or one or more other elements of the system 100 described herein). According to one embodiment, the permission indication causes the activated or selected permissible content element to convert to a permitted content element. In one or more embodiments, the conversion is recorded in a content elements database 110. As described herein, in at least one embodiment, the permitted content element is a content element that is rendered by the Touch Point 123 on a display of a navigation application 121 when the system 100 determines that deployment criteria associated with the permitted content element have been satisfied (e.g., based on mapping metadata associated with the navigation application 121). In some embodiments, the display of the navigation application 121 can refer to a display device corresponding to a computing device that executes the navigation application 121. In other embodiments, the display of the navigation application 121 can correspond to another display device, such as a display device that is mirroring with a computing device that executes the navigation application 121 or another display device that renders content of the navigation application 121.

In one example, the institution server 105 receives, from the OPS 103, permissible content elements associated with a segment. In the same example, the institution server 105 receives a request from a Touch Point 123 for access to a communication portal. Continuing the same example, the request includes a secure identifier associated with a particular subset of a plurality of users (and particular data thereof) in the segment, thereby allowing the institution server 105 to uniquely identify and associate the subset of the users and particular data and the Touch Point 123. In the same example, the subset of the users and particular data is associated with a user of the Touch Point 123. Continuing with the same example, the institution server 105 transmits the request to the OPS 103, generates the requested communication portal, and automatically injects (e.g., via a script, such as JavaScript™ loaded from a script server) the permissible content elements into the communication portal. In the same example, the permissible content elements are provided by the OPS 103 and are included by the OPS 103 based on a spend history of the user associated with the subset of the users and particular data.

Continuing the same example, when the user associated with the subset of the users and particular data requests the communication portal (e.g., via the Touch Point 123), the Touch Point 123 renders the communication portal on a display of the Touch Point 123, including the permissible content elements as interactive elements. In the same example, when the user selects or activates one or more of the permissible content elements, the Touch Point 123 automatically transmits a permission indication to the institution server 105 (or one or more other elements of the system 100 described herein). Continuing the same example, the institution server 105 transmits the permission indication to the OPS 103 and/or OMS 113 that causes conversion of the selected or activated one or more permissible content elements to one or more permitted content elements, the conversion being recorded or stored in a content elements database 110.

Alternatively, or in addition, selection by the user (associated with the subset of the users and particular data) of the one or more permissible content elements causes the Touch Point 123 to automatically call to a beacon service 116. According to one embodiment, the call to the beacon service 116 includes, but is not limited to, the Touch Point 123 accessing a single pixel webpage and providing a secure identifier and a public identifier thereto (for identifier association processes described herein). In at least one embodiment, the call to the beacon service 116 is transmitted to the OMS 113, thereby causing the system to match various identifiers associated with the user and thereby match one or more permitted content elements with the various identifiers associated with the user. In some embodiments, associating the one or more permitted content elements with various identifiers may enable the system to serve the one or more permitted content elements (or a related content element) to the user via a different application or computing system (while the user remains anonymous).

According to one embodiment, as discussed herein, a permissible content element is an electronic offer or promotion for a good or service (e.g., that may be loaded onto or associated with a debit or credit card of a user) that provides a reward and/or a particular rate or discount for good or service described in the offer. As described herein, permissible content elements are rendered within an application, on displays of Touch Points 123 or other electronic devices that include or are connected to displays. In one or more embodiments, the permissible content elements are selectable or activatable. In various embodiments, upon receiving an input (e.g., a touch or click) selecting or activating a permissible content element, the Touch Point 123 causes transmission of a permission indication, to the system 100.

In one or more embodiments, transmission of the permission indication includes, but is not limited to: 1) transmitting a permission signal to the OMS 113; and 2) updating one or more permission fields in the content database 110 associated with the permitted content element to indicate the received permission. According to one embodiment, a communication portal transmits the permission indication to the institution server 105, the institution server 105 provides the permission indication to the OPS 103, and the OPS 103 provides the permission indication to the OMS 113 (e.g., which causes a content elements database 110 to convert a corresponding permissible content element to a permitted content element).

According to one embodiment, permissible content elements are generated and selectively transmitted based on a history of transactions (or other recorded actions and information) associated with a user. In at least one embodiment, the transaction environment 101 includes a transactions database 109 and a de-identified transactions database 111 from which the history of transactions may be accessed, updated, and maintained. In various embodiments, an institution transaction processor 107 performs de-identification processes on transactions of the transactions database 109 to generate and populate the de-identified transactions database 111 with the de-identified transactions. In one or more embodiments, the transactions database 109 and de-identified transactions database 111 are each representative of a plurality of databases 109 and a plurality of databases 111 as can be appreciated.

In at least one embodiment, the institution transaction processor 107 provides the de-identified transactions to the institution server 105 that transmits the de-identified transactions to the OPS 103. In at least one embodiment, transmissions between the OPS 103 and the institution server 105 are secured by a de-identification firewall 102 that prevents transmission of personally identifying transaction data between any elements of the system 100 other than the institution server 105 and institution transaction processor 107. In various embodiments, the OPS 103 provides the de-identified transactions and particular data associated therewith to the OMS 113. In at least one embodiment, the OMS 113 generates or receives one or more permissible content elements for the user associated with the particular data based on the de-identified transactions associated therewith, as well as deployment criteria, media, and customization data received from an entity. In one or more embodiments, the OPS 103 receives permissible content elements from the OMS 113 and transmit the permissible content elements to the institution server 105 for inclusion in communication portals generated thereby.

In at least one embodiment, the system 100 includes a content elements database 110 that stores and organizes content elements, including permissible content elements generated by the OMS 113, as well as permitted content elements (e.g., permissible content elements for which a permission indication has been received). In various embodiments, the content elements database 110 organizes the permissible and permitted content elements based on users, particular data and/or public identifiers, secure identifiers, and/or segment identifiers associated therewith. In at least one embodiment, the OMS 113 is operative to transmit permissible and/or permitted content elements from the content elements database 110 to one or more of the OPS 103, the Touch Point 123, the demand-side platform 115, and/or other elements of the system 100. According to one embodiment, transmissions from the OMS 113 include segment, device, secure, and/or public identifiers associated with the permissible and/or permitted content elements being transmitted.

In one or more embodiments, the system 100 includes a deployment criteria database 112 that stores and organizes deployment criteria generated or received by the OMS 113 (e.g., in response to receiving criteria selections from entities in communication therewith). As described herein, the OMS 113 compares mapping metadata to associated deployment criteria from the deployment criteria database 112 and, upon determining that the associated deployment criteria are satisfied, transmits associated permitted content elements to one or more of the publisher web server 119, the navigation application 121, the Touch Point 123, a demand-side platform (DSP) 115, an interchange platform 117, and/or other elements of the system 100.

In at least one embodiment, the system 100 includes the demand-side platform (DSP) 115 operative to communicate with the interchange platform 117 and the OMS 113. In various embodiments, the DSP 115 receives permitted content elements from the OMS 113 and generates and communicates bids or proffers to the interchange platform 117. According to one embodiment, the interchange platform 117 is an advertisement exchange platform. In at least one embodiment, the proffers are directed towards obtaining a right (e.g., an advertisement right) to provide a permitted content element to the navigation application 121 running on the Touch Point 123 (or other electronic device) that is associated with the user (e.g., or data or identifiers associated with the user) and permitted content elements. According to one embodiment, a proffer may include a predetermined amount (e.g., a bid) for purchasing permission to publish a permitted content element (or any content element) on a display of the navigation application 121. In one or more embodiments, the predetermined amount may be an amount stored in a database of the DSP 115 (not shown) and associated with the entity that dictated deployment criteria determined to be satisfied by the OMS 113, navigation application 121, DPS 115, or interchange platform 117 (based on received mapping metadata). In at least one embodiment, the predetermined amount may be set based on a selection received from the entity during a permissible content campaign process executed by the OMS 113 for the entity (e.g., the same process by which the OMS 113 received the permissible content elements and associated deployment criteria).

In various embodiments, the content elements database 110 is organized based on received permission indications corresponding to the one or more users (e.g., or particular data thereof) associated with the stored permissible content elements. According to one embodiment, upon the system 100 receiving a permission indication from a Touch Point 123 for a particular permissible content element, the content elements database 110 converts the particular permissible content element to a particular permitted content element by updating metadata thereof.

In one example, the content elements database 110 include one or more multi-dimensional data arrays for organizing permissible content elements. In the same example, the one or more multi-dimensional data arrays include axes for permissible content identifiers, segment identifiers, public identifiers, and/or secure identifiers, and other information. Also, in the same example, fields of the one or more multi-dimensional data arrays include Boolean operators for indicating whether a permission indication has been received for a permissible content element associated with a user (or particular data thereof). As described herein, permissible content elements for which permission has been received are generally referred to as permitted content elements. In some embodiments, the Boolean operators are stored in bit arrays in sets (e.g., 64 bit, 32 bit, or 8 bit sets).

In at least one embodiment, the OMS 113 performs a permissible content campaign process based on selections received from an entity. In one or more embodiments, the OMS 113 generates (or receive from the entity) permissible content elements and selections for deployment criteria and/or a proffer. In at least one embodiment, the OMS 113 stores the permissible content elements in the content elements database 110 and the deployment criteria in the deployment criteria database 112, along with segment, secure, and/or public identifiers associated with users (and particular data thereof) to which the entity desires to provide the permissible content elements. In various embodiments, the OMS 113 stores the proffer amount and/or provides the proffer amount to the DSP 115 that stores the proffer amount in the database thereof, along with the identifiers associated with the permissible content elements. According to one embodiment, when the OMS 113 determines that the associated deployment criteria have been satisfied (e.g., based on received mapping metadata), the OMS 113 causes the DSP 115 to retrieve and transmit the stored, associated proffer amount and permitted content elements, to the interchange platform 117. In at least one embodiment, the interchange platform 117 confirms purchase of the publishing permissions (at the proffer amount) with the DPS 115 and the DPS 115 instructs OMS 115 to deploy the permitted content element to the Touch Point 123 of each of the users (or particular data) of the segment associated with the deployment criteria that were determined to be satisfied.

In at least one embodiment, the navigation application 121 refers to a location-based software application running on an electronic device, such as, for example, the Touch Point 123, tablets, personal computers, or any other suitable electronic device configured to receive and transmit electronic information. In at least one embodiment, the navigation application 121 is operated by a third-party, or may be a "native" navigation application 121. As used herein, "native" generally refers to a quality of being substantially controlled and operated by the system 100 (e.g., or a system operating the system 100). In one or more embodiments, the navigation application 121 is in communication with, via an application programming interface (API) 108, the publisher web server 119 that facilitates communication between the navigation application 121 and other elements of the system 100.

In at least one embodiment, the API 108 is a native or a third-party API. In one example, the API 108 is a third-party API 108 operated by the same third-party operating the navigation application 108. In another example, the API 108 is a native API operated by the same party substantially operating and controlling the system 100. According to one embodiment, the API 108 provides software routines, protocols, and tools for communicating with and configuring actions of the navigation application 121.

In various embodiments, the system 100 includes an external data information system 125. In at least one embodiment, the external data information system 125 performs functions including, but not limited to communicating with third-party systems (not shown) of entities to determine availability of goods and/or services, to determine whether a user has accessed the goods and/or services and storing transaction data (e.g., SKU-level transaction data). According to one embodiment, the external data information system 125 includes, but is not limited to, a transaction detail (TDS) system 127 communicably coupled to a retail transactions database 129 and a third-party segment database 131. In one or more embodiments, the TDS system 127 de-identifies transactional data from the retail transactions database 129 and provide the de-identified transactional data to the OMS 113. According to one embodiment, TDS system 127 receives transmissions from the third-party systems and populate the retail transactions database 129 and third-party segment database 131 with data included therein. In at least one embodiment, the transmission data includes, but is not limited to, the transactional data and/or segment data. In at least one embodiment, the TDS system 127 provides the segment data to the OMS 113 for use in segment and permissible content generation processes described herein. In various embodiments, the segment data includes, for example, particular transaction categories, patterns, or other traits for a desired subset of a plurality of users and/or particular data thereof (such as user accounts), the desired subset being a subset of the users which an entity would like to target with permissible content elements.

In at least one embodiment, the Touch Point 123 is any electronic device capable of running the navigation application 121. In one or more embodiments, the Touch Point 123 includes, but is not limited to, mobile devices, tablets, portable computers, and global positioning system (GPS) devices, among others. In at least one embodiment, the Touch Point 123 includes or is communicably coupled to a display. In various embodiments, the display includes, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

In at least one embodiment, the Touch Point 123 includes a device identifier, such as, for example, a hardware address, MAC address, mobile advertising identifier, or other identifier that allows the system 100 to uniquely identify the Touch Point 123. According to one embodiment, the device identifier is generated by the system 100 (for example, by the OMS 113) and transmitted to and stored at the Touch Point 123. In one or more embodiments, the Touch Point 123 includes cookie data, the cookie data having been provided to the Touch Point 123 during an interaction with a content element (such as an offer or advertisement) in an internet-based environment. In at least one embodiment, the cookie data includes a public identifier generated by the system 100 to uniquely identify users and/or particular data associated with the Touch Point 123.

In one or more embodiments, the system 100 includes a beacon service 116 that facilitates pairing or associating of a secured identifier with a public identifier. In at least one embodiment, the beacon service receives beacon calls from the Touch Point 123, for example, in instances where the Touch Point 123 receives a transmission from the institution server 105 that causes the Touch Point 123 to transmit a secure identifier and a public identifier in a transmission to the beacon service 116. In various embodiments, the transmission from the institution server 105 is referred to as a "beacon" and includes, but is not limited to, an instruction for the Touch Point 123 to make a request to the beacon service 116, the instruction including the secure identifier. In one example, the beacon is a single pixel image HTML code with a URL pointing to the beacon service 116. Further description of the beacon service 116 and functions thereof are provided in U.S. patent application Ser. No. 14/617,112, incorporated herein by reference as if set forth in its entirety.

In at least one embodiment, the transaction environment 101 and navigation application 121 are provided and/or controlled by a single entity (or other entity providing services to the user). In one or more embodiments, as shown in FIG. 1, the transaction environment 101 transmits and receives information to and from the navigation application 121. In one example, one or more institution servers 105 communicate, through a firewall 104, with the navigation application 121 or a Touch Point 123 in communication therewith. In another example, an offer placement system (OPS) communicates, via a publisher web server 119 and/or an API 108, with the navigation application 121.

In one or more embodiments, the transaction environment 101 transmits one or more permissible content elements to the navigation application 121 running on the Touch Point 123, the Touch Point 123 and/or navigation application 121 being associated with particular data (e.g., a user account) of a user. According to one embodiment, the navigation application 121 causes the Touch Point 123 to render, on a display, the one or more permissible content elements, including fields for receiving selection or activation inputs therefor. In at least one embodiment, the navigation application 121 receives a selection or activation input for one of the one or more permissible content elements (e.g., causing conversion to a permitted content element). In at least one embodiment, in response to receiving the selection or activation input, the navigation application 121 causes the Touch Point 123 to render a display of the navigation application 121 including at least one location of an entity associated with the permitted content element. According to one embodiment, the navigation application 121 transmits the permission input to the transaction environment 101 that applies an offer associated with the permitted content element to a credit card, debit card, payment account, etc. of a user, thereby allowing the user to access the offer at the at least one location.

Turning to FIGS. 2-6, as will be understood by one having ordinary skill in the art, the steps and processes shown in FIGS. 2-6 may operate concurrently and continuously, are generally asynchronous and independent, and are not necessarily performed in the order shown. In various embodiment, the steps of FIGS. 2-6 correspond to steps of a method performed by one or more components of the system 100 (FIG. 1).

Figure 2:
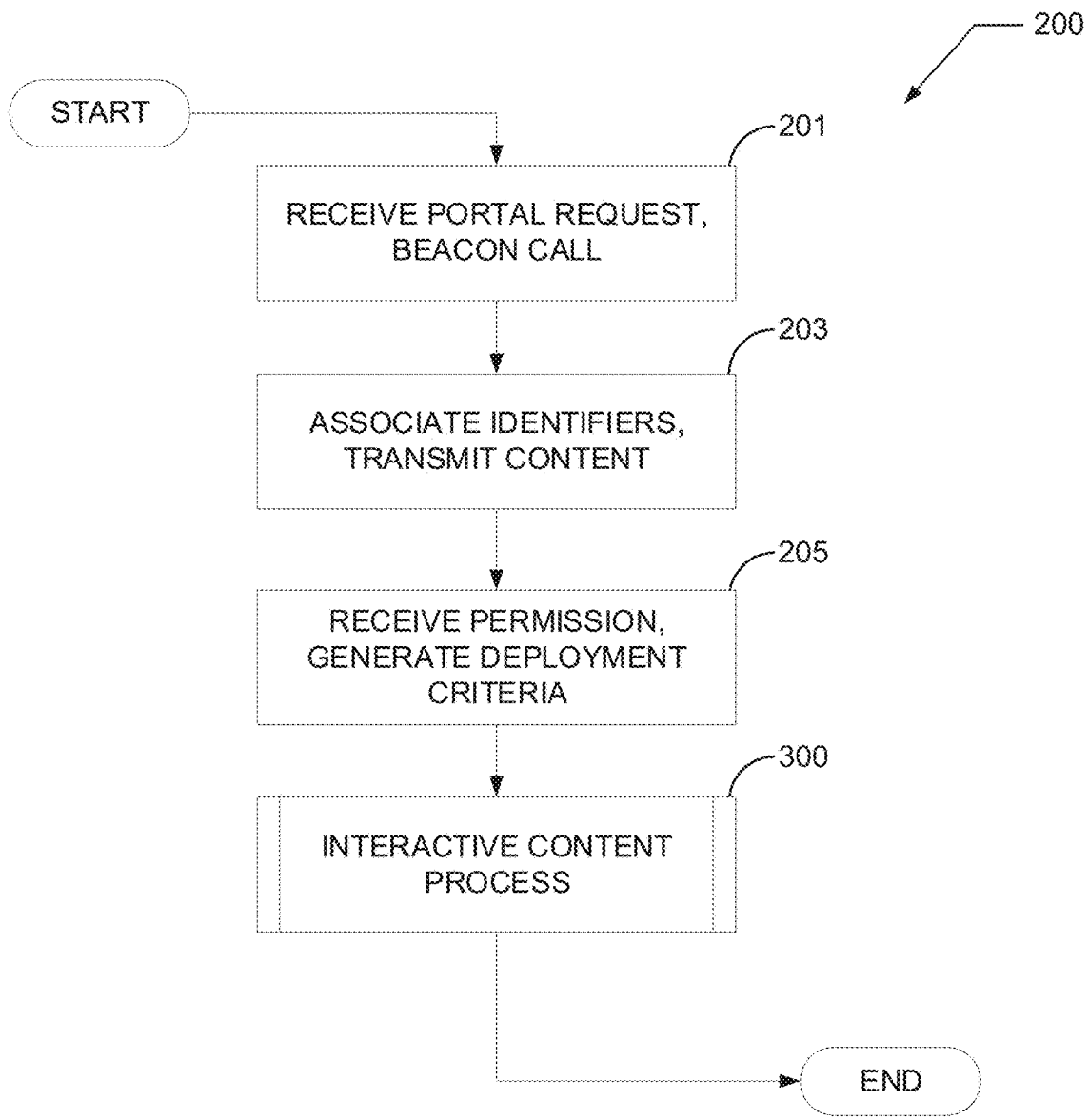
FIG. 2 is a flowchart of an exemplary content permission process according to one embodiment of the present disclosure.

FIG. 2 shows a flowchart of an exemplary content permission process 200. At step 201, the process 200 includes receiving a request for access to a communication portal. In at least one embodiment, the request is received at an institution server 105 from a Touch Point 123 associated with a. In various embodiments, in response to the request, the institution server 105 transmits a secure identifier and executable code to the Touch Point 123 that causes the Touch Point 123 to "call" (e.g., access) a beacon web address (e.g., a single pixel HTML address) associated with a beacon service 116. According to one embodiment, the secure identifier is generated and transmitted by the OPS 103 to the institution server 105 that transmits the secure identifier the Touch Point 123. In at least one embodiment, the secure identifier is used by the system 100 to uniquely identify the user and/or the particular data associated with the user.

In one or more embodiments, a beacon "call" (e.g., transmission) from the Touch Point 123 to the beacon service 116 (e.g., received at the beacon web address) includes the secure identifier and a public identifier stored on the Touch Point 123. As will be understood from discussions herein, a public identifier is an identifier dropped on the Touch Point 123 during a cookie interaction (e.g., as a result of the Touch Point 123 receiving a cookie in response to the Touch Point 123 accessing particular web-based content), is a mobile device identifier (e.g., advertising identifier), and/or previous beacon call. In various embodiments, the beacon call is received from the Touch Point 123 at the beacon service 116. . In one or more embodiments, the beacon service provides the secure identifiers and public identifiers to the OMS 113.

As will be understood from discussions herein, the system 100 may be configured to track a user (anonymously) across multiple devices via identifier matching. For example, each time a user accesses a communications portal (e.g., via a log in), a secure identifier is associated with the device used by the user to access the communications portal (e.g., via the process discussed above). If the user accesses the communications portal with multiple devices, the system 100 may match the secure identifier (which stays constant) with multiple public identifiers (e.g., device identifiers), thereby associating multiple devices with a secure identifier.

In various embodiments, the request causes the institution transaction processer 107 to retrieve transactions associated with the secure identifier from the transactions database 109 for inclusion by the institution server 105 within the communication portal provided to and rendered on the corresponding Touch Point 123.

At step 203, the process 200 includes associating the secure identifier and public identifier at the OMS 113, thereby uniquely identifying the user and particular data associated with the Touch Point 123 that performed the call to the beacon service 116. Because the OMS 113 associates the transaction-related secure identifier with the external (e.g., content-related) public identifier, the system 100 can target the user (or particular data thereof, such as a user account) with permissible content elements through platforms outside of the transaction environment 101. For example, prior to identifier association, the system 100 may only target the user with permissible content elements (based on a transaction history of the user) in a communication portal provided by the institution server 105. In the same example, following identifier association, the system 100 may target the user and/or their particular data with permissible contents based on the transaction history on platforms including but not limited to: 1) publicly accessible websites; 2) software applications, including mobile device applications; and 3) other platforms external to the transaction environment 101.

At step 203, the process 200 includes transmitting permissible content elements to the Touch Point 123 by including the permissible content elements in the communication portal. According to one embodiment, the OPS 103 and OMS 113 performs segment and campaign generation processes based on a de-identified transaction history associated with the user or their particular data. Based on the de-identified transaction history, the OMS 113 identifies a subset of a plurality of permissible content elements with which to target the user (or user account thereof) by including the subset of permissible content elements in the communication portal provided to the Touch Point 123 associated with the user (e.g., via the OPS). In at least one embodiment, the subset of the plurality of permissible content elements are identified based on one or more segments associated with the user or their particular data (e.g., as a result of segment generation processes).

As can be appreciated, the steps 201-203 occur at sufficient speeds such that rendering of the communication portal and inclusion of the permissible content elements with the communication portal is perceived, by the corresponding user, to have occurred substantially instantaneously. In other words, it will be understood by one of ordinary skill in the art that the steps 201-205 typically occurs on a below one millisecond time-frame, below one hundred millisecond time-frame, or below five hundred millisecond time-frame, such that there is little or no delay apparent to a user viewing the display of the Touch Point 123.

At step 205, the process 200 includes: 1) receiving activation or selection of at least one permissible content elements; and 2) converting the at least one permissible content element to at least one permitted content element based on receiving a permission indication associated with the activation or selection of the at least one permissible content elements from a Touch Point 123. In one or more embodiments, receiving the activation or selection includes, but is not limited to, receiving a permission signal from the Touch Point 123 at the institution server 105 (e.g., via the provided communication portal) in response to receiving input selecting the one or more permissible content elements. In at least one embodiment, the permission signal includes identifiers for each of the at least one permitted content elements, as well as one or more of the secure identifier and the public identifier associated with the user and/or particular data thereof. According to one embodiment, the permission signal is provided by the institution server 105 to the OPS 103 and/or OMS 113 that causes the content element database 110 to activate the one or more permissible (now permitted) content elements, activation including updating one or more data fields associated with the user or their particular data to indicate that the one or more permissible content elements are permitted content elements.

For example, a user of the Touch Point 123 (and associated with particular data) requests access to and is provided, via the Touch Point 123, a communication portal including a subset of a plurality of permissible content elements. In the same example, the Touch Point 123 receives input from the user selecting or activating a permissible content element of the subset of permissible content elements, thereby providing permission for the an offer, discount, etc. to be added to, or associated with, the user's debt card, credit card, or bank account.

Continuing with this example, the system then causes the permissible (now permitted; selected) content element to be rendered on a display of a navigation application 121 running on the Touch Point 123 (e.g., upon satisfaction of deployment criteria, as described herein). Continuing the same example, the institution server 105 receives a permission signal from the Touch Point 123, the permission signal including identifiers associated with the permitted content element (e.g., and stored in metadata thereof). In the same example, the OMS 113 receives the identifiers and causes the content elements database 110 to activate the one or more permissible (now permitted) content elements by updating one or more fields associated with the user (and/or the one or more permissible content elements) to indicate that the one or more permissible content element are now permitted content elements.

At step 205, the process 200 includes generating deployment criteria that, when satisfied, causes the one or more permitted content elements to be rendered on a display of the navigation application 121 on the Touch Point 123. According to one embodiment, the deployment criteria are generated at the OMS 113 in response to receiving deployment criteria selections from one or more entities associated with the one or more permitted content elements. As described herein, each of the one or more entities is associated with one or more physical locations, and the content elements database 110 include the one or more physical locations (e.g., at which offers from one or more entity-associated, permissible content elements can be redeemed). In various embodiments, the generation of deployment criteria occurs during a content campaign process that provided the permitted (formerly permissible) content elements to the system 100. Thus, it is understood that generation of the deployment criteria may occur prior to other processes and steps of the process 200.

In at least one embodiment, the deployment criteria includes, but is not limited to, temporal criteria, locational criteria, availability criteria, and other criteria. In one or more embodiments, the temporal criteria includes, but is not limited to: 1) an operating window corresponding to hours of operation of one or more entity locations (e.g., places of business) associated with the one or more permitted content elements; 2) holiday and weekend criteria that may be satisfied when a current calendar date does or does not fall on one or more of: federal holidays, religious holidays, and one or more particular calendar days designated by the entity associated with the one or more permitted content elements; 3) a predetermined detour time corresponding to a maximum period of time required to travel to one of the one or more entity locations from one or more of an origination location, a terminating location, and a current location of the Touch Point 123 (e.g., travel occurring along a known network of roadways); 4) a predetermined expiration date (e.g., upon which goods or services indicated in the one or more permitted content elements will become unavailable) and 5) other temporal criteria.

In at least one embodiment, the locational criteria includes, but is not limited to: 1) a separation length corresponding to a maximum travel distance or maximum radius between the one or more entity locations and one or more of the origination location, terminating location, and the current location of the Touch Point 123; 2) proximity of the one or more entity locations to a geofence of predetermined size associated with one or more of the origination location, terminating location and the current location of the Touch Point 123; 3) proximity of the Touch Point 123 to a geofence of predetermined size associated with each of the one or more entity locations; 4) weather criteria that may be satisfied when current or predicted weather conditions exclude severe weather conditions such as ice, snow, wind, fire, flood, etc., the weather conditions being associated with one or more of the current location, origination location, and terminating location of the Touch Point 123 and the one or more entity locations; and 5) other locational criteria.

In various embodiments, the availability criteria includes, but is not limited to, the availability of a good or service (indicated in the one or more permitted content elements) at the one or more entity locations, the availability criteria being satisfied when the good or service is currently available. According to one embodiment, satisfaction of the availability criteria are determined at an external data information system 125 as described herein.

In at least one embodiment, the OMS 113 generates a criteria identifier for each of the deployment criteria generated at step 205. In at least one embodiment, the criteria identifiers are utilized to store and organize the deployment criteria in one or more databases of the system 100, and to track satisfaction of the deployment criteria as described herein.

Following step 205, the process 200 includes performing an interactive content transmission process 300, 400, or 500, as described herein to cause at least one permitted content element to be rendered on a display of the navigation application 121 on the Touch Point 123.

Figure 3:
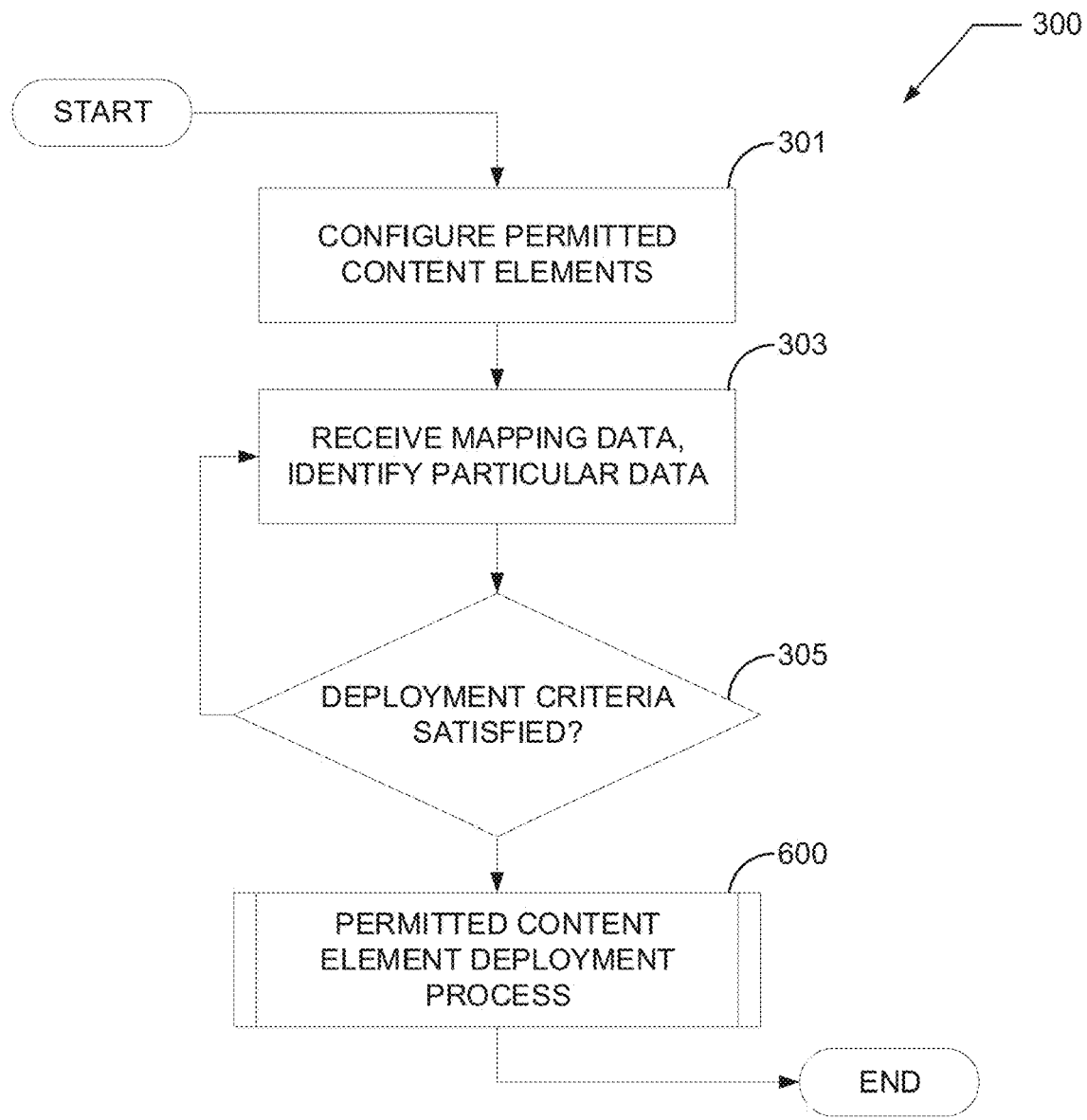
FIG. 3 is a flowchart of an exemplary interactive content transmission process according to one embodiment of the present disclosure.

FIG. 3 shows a flowchart of an exemplary interactive content transmission process 300. As described herein, the process 300 generally refers to a process for transmitting interactive content to a third-party-operated navigation application 121 via an API (opposed to an ad exchange, which is discussed with reference to FIG. 4).

According to one embodiment, step 301 is initiated upon launch of the navigation application 121 on a Touch Point 123. In one or more embodiments, the launch of the navigation application 121 causes the Touch Point 123 to establish communications with the OMS 113 and the publisher web server 119 via the API 108, which may be a third-party API 108 or a native API 108 as described herein. In at least one embodiment, the publisher web server 119 requests one or more of a secure identifier, public identifier, and device identifier from the Touch Point 123. In various embodiments, the Touch Point 123 transmits the requested identifier(s) to the publisher web server 119 that provides the identifier(s) to the OMS 113. In at least one embodiment, the OMS 113 uses the identifier(s) to identify a user and particular data associated therewith. After identifying the user and particular data, the OMS 113 retrieves one or more permitted content elements and corresponding deployment criteria associated with the user and/or their particular data.

According to one embodiment, following the launch, the navigation application 121 requires receipt of a confirmation input before causing the communication with the OMS 113 and the publisher web server 119. For example, upon launch, the navigation application 121 renders a confirmation window for receiving a confirmation input. In one or more embodiments, the confirmation is rendered on a display of the Touch Point 123, output via a speaker, or rendered in another manner. In the same example, upon receiving the confirmation input at the confirmation window (e.g., from the user associated with the Touch Point 123 and the particular data), the navigation application 121 initiates the communication.

At step 301, the process 300 includes configuring the one or more permitted content elements. Configuring the one or more permitted content elements includes, but is not limited to, the OMS 113 transmitting the one or more permitted content elements to the navigation application 121 running on the Touch Point 123. According to one embodiment, the transmission of the one or more permitted content elements occurs at a publisher web server 119 in communication with the navigation application 121 via an API 108. In at least one embodiment, the one or more permitted content elements include media to be included in renderings of the one or more permitted content elements. Because the one or more permitted content elements and/or media thereof require a latency period to transmit to the Touch Point 123, transmission of the one or more permitted content elements may be performed prior to rendering of the one or more permitted content elements to reduce the duration of the latency period between determining satisfaction of deployment criteria and rendering the one or more permitted content elements on a display of the navigation application 121 on the Touch Point 123. In at least one embodiment, the transmission includes segment identifiers and/or content element identifiers for each of the one or more permitted content elements, the segment and/or content element identifiers being sourced from the segment and/or content element identifiers used for organizing content elements within the content element database 110 and/or segments within one or more other databases of the system 100. In at least one embodiment, the transmission includes customization data (as described herein) associated with the one or more permitted content elements.

In some embodiments, step 301 includes transmitting the deployment criteria generated at step 300 to the navigation application 121. Transmission of the deployment criteria to the navigation application 121 is performed, for example, in embodiments of the system 100 where the navigation application 121 determines whether or not the deployment criteria are satisfied based on mapping metadata.

At step 303, the process 300 includes receiving mapping metadata and/or one or more identifiers or other data identifying a user. In various embodiments, the mapping metadata is received from the navigation application 121, via the Touch Point 123 and API 108, at the publisher web server 119. In at least one embodiment, the publisher web server 119 provides the mapping metadata to the OMS 113 for satisfaction determining purposes. In one or more embodiments, the mapping metadata includes, but is not limited to: 41) locational metadata describing one or more of the origination location, terminating location, and current location along the pathway of the Touch Point 123 (e.g., the pathway generated by the navigation application 121 in response to receiving selections requesting navigation between the origination and terminating locations); and 2) metadata describing a current and/or predicted weather condition associated with one or more of the origination location, terminating location, and current location along the pathway of the Touch Point 123 and the one or more entity locations. According to one embodiment, the locational data is data sourced from a global positioning system (GPS) or another satellite-based positioning system.

In at least one embodiment, the system may receive data identifying a user or particular identifier with the mapping metadata from the Touch Point 123, including, but not limited to: 1) one or more of the secure identifier, public identifier, and device identifier associated with the particular data, thereby providing indication that the mapping metadata is associated with the particular data; 2) segment and/or content element identifiers associated with the one or more permitted content elements stored within the navigation application 121; and 3) criteria identifiers corresponding to the deployment criteria associated with the one or more permitted content elements.

In various embodiments, the OMS 113 stores the mapping metadata in temporary memory of the system 100, where the mapping metadata may remain until the system 100 has determined whether or not the deployment criteria are satisfied based on the mapping metadata. As will be understood from discussions herein, the mapping metadata may be matched or associated with a user, user data, and/or one or more identifiers discussed herein at the OMS 113.

At step 305, the system 100 determines whether the deployment criteria are satisfied based on the mapping metadata. According to one embodiment, if the system 100 determines the deployment criteria to be satisfied, the process 400 proceeds to the next step of executing a permitted content element deployment process 600 as described herein. In at least one embodiment, if the system 100 determines that any (or at least some or a predefined number) of the deployment criteria are unsatisfied, the process 400 returns to step 303 (or step 505 as also described herein at FIG. 5).

In at least one embodiment, the OMS 113 retrieves the deployment criteria associated with each of the one or more permitted content elements. In one or more embodiments, the OMS 113 performs comparisons between the mapping metadata and the deployment criteria to determine satisfaction of each criterion therein. In at least one embodiment, the OMS 113 calculates metrics including but not limited to: 1) a separation length, travel distance, or radius between each of the one or more entity locations and one or more of the origination location, terminating location, and current location along a pathway of the Touch Point 123; and 2) a proximity of the Touch Point 123 or the one or more entity locations to each of one or more geofences (previously configured by the OMS 113 based on entity inputs) associated with one or more of the origination location, terminating location, and current location along the pathway of the Touch Point 123 and the one or more entity locations. According to one embodiment, one or more of the detour time, separation length, travel distance, radii, and proximities are calculated by the navigation application 121 and included in the mapping metadata.

In various embodiments, the OMS 113 retrieves the data describing the current and/or predicted weather conditions and determine whether the current and/or predicted weather conditions exclude severe weather conditions or some other preconfigured weather condition. In some embodiments, if the OMS 113 determines the current or predicted weather conditions exclude the preconfigured weather condition, the OMS 113 determines the weather deployment criteria to be satisfied.

In one or more embodiments, if the calculated detour time is less than a deployment criteria detour time, the OMS 113 determines the detour time deployment criteria to be satisfied. In at least one embodiment, if the calculated separation length, travel distance, or radius are within a deployment criteria travel distance or radius, the OMS 113 determines the corresponding separation length, travel distance, or radius deployment criteria to be satisfied. In various embodiments, if one or more of the origination location, terminating location, and current location along the pathway of the Touch Point 123 are within at least one of the one or more geofences associated with the one or more entity locations, the OMS 113 determines the (entity location) geofence deployment criteria to be satisfied. In further embodiments, if at least one of the one or more entity locations are within the one or more geofences associated with one or more of the origination location, terminating location, and current location along the pathway, the OMS 113 determines the (Touch Point 123) geofence deployment criteria to be satisfied.

In various embodiments, based on the content element identifiers, the OMS 113 communicates, via the transaction environment 101 and firewall 104, with a transaction detail system 127 to determine whether or not goods or services associated with the one or more permitted content elements are currently available. In at least one embodiment, the OMS 113 determines whether the goods or services will be available upon arrival of the Touch Point 123 at the one or more entity locations at a particular time equal to the current time plus the calculated detour time. If the goods or services are available (currently and/or upon the arrival), the OMS 113 determines the availability deployment criteria to be satisfied.

In one or more embodiments, the OMS 113 evaluates a current date and time to determine satisfaction of temporal deployment criteria. In at least one embodiment, the OMS 113 retrieves a time stamp from the mapping metadata and identifies one or more of: 1) whether or not the current date occurs on a holiday, weekend, and/or other indicated dates provided by the one or more entities during deployment criteria generation; 2) whether or not the current date and time occur within the window of operation associated with each of the one or more entity locations; and 3) whether or not the current date occurs on or before the predetermined expiration date. According to one embodiment, if the OMS 113 determines that the current date and time fall within the expiration and the window of operation of at least one of the one or more entity locations, and does not fall on a holiday, weekend, or other indicated dates, the OMS 113 determines the corresponding temporal criteria to be satisfied.

In various embodiments, the OMS 113 calculates a detour time between each of the one or more entity locations and one or more of the origination location, terminating location, and current location along a pathway of the Touch Point 123. In at least one embodiment, the OMS 113 compares the calculated detour time to the predetermined detour time of the deployment criteria and, if the calculated detour time is less than or equal to the predetermined detour time, the OMS 113 determines the detour time temporal deployment criteria to be satisfied.

It will be understood that the determination of satisfaction of deployment criteria may be performed only with respect to deployment criteria associated with the one or more permitted content elements. Thus, in some embodiments, one or more of the deployment criteria described herein may be omitted from evaluation. It will also be understood that, in some embodiments, the OMS 113 performs deployment criteria determinations in a piece-wise and/or filtering manner to advantageously reduce a time and/or computing cost of determining the deployment criteria to be unsatisfied. For example, the OMS 113 may first determine satisfaction of availability criteria, then temporal criteria, then locational criteria, the OMS 113 being configured to find the deployment criteria wholly unsatisfied if any of the availability, temporal, or locational criteria are unsatisfied. In the same example, if the OMS 113 determines that one or more of the availability criteria are unsatisfied, the OMS 113 determines that the deployment criteria are not satisfied and return to step 301 (or step 505 as described herein). In another example, the OMS 113 determines satisfaction all deployment criteria simultaneously. While each and every permutation of deployment criteria determination process sequencing are not described herein, additional permutations of deployment criteria determination process sequencing as would be understood from discussions herein are contemplated.

According to one embodiment, upon the OMS 113 determining the deployment criteria to be satisfied, the OMS 113 transmits a deployment criteria satisfaction indication (e.g., a signal, transmission, etc.) to one or more of the DSP 115, the interchange platform 117, the publisher web server 119, and the navigation application 121. In one or more embodiments, the process 300 (or 400, or 500) may proceed to performing the process 600 only after receipt of the deployment criteria satisfaction indication.

In one or more embodiments, the process 300 (or 400, or 500) may proceed even if the deployment criteria are not entirely satisfied. In at least one embodiment, the deployment criteria include a dissatisfaction threshold that, when not met or exceeded, causes the OMS 113 to determine the deployment criteria to be satisfied and to transmit the deployment criteria satisfaction indication regardless of one or more of the deployment criteria being determined unsatisfied. In one or more embodiments, the step 305 includes incrementing a dissatisfaction threshold following each instance in which the OMS 113 determines one of the deployment criteria to be unsatisfied. According to one embodiment, the dissatisfaction threshold is configured during deployment criteria generation processes occurring between the OMS 113 and the one or more entities. In various embodiments, the dissatisfaction threshold allows the system 100 to transmit permitted content elements to users or user accounts based on mapping metadata that does not satisfy each and every aspect of deployment criteria, but satisfies a subset of the deployment criteria sufficient to merit transmission of the permitted content elements.

Following step 305, the process 300 includes performing a permitted content element deployment process 600 as described herein.

Figure 4:
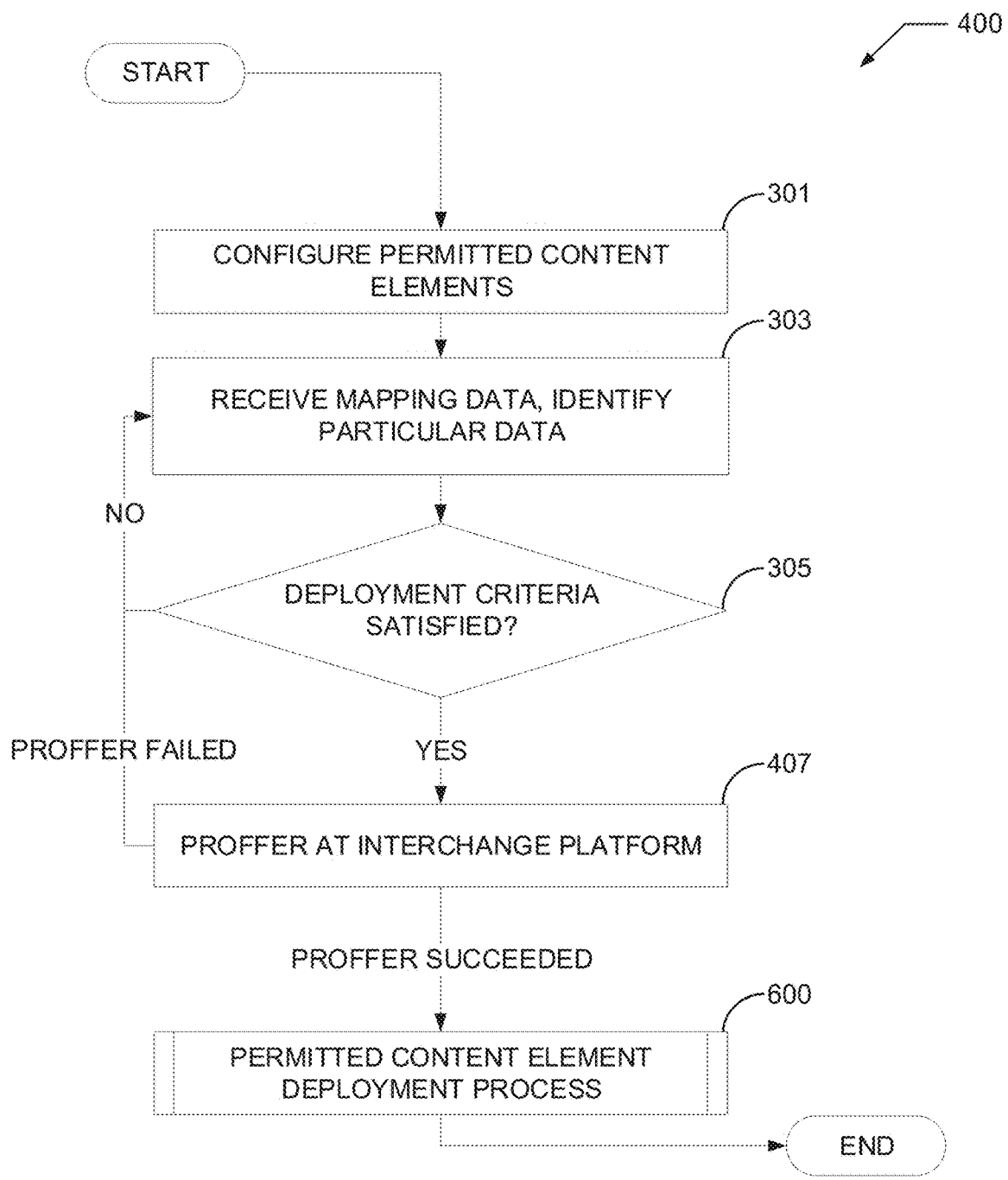
FIG. 4 is a flowchart of an exemplary interactive content transmission process according to one embodiment of the present disclosure.

FIG. 4 shows a flowchart of an exemplary interactive content transmission process 400. As described herein, the process 400 generally refers to a process for transmitting interactive content to a third-party-operated navigation application 121 via an interchange platform 117.

At step 301, the process 400 includes configuring the one or more permitted content elements as described herein. In at least one embodiment, configuring the permitted content elements includes providing the deployment criteria and various identifiers associated with the one or more permitted content elements to a demand-side platform and/or interchange platform 117 described herein.

At step 303, the process 400 includes receiving mapping metadata and identifying particular data and/or a user therefrom as described herein. According to one embodiment, in the process 400, the mapping metadata is received at the DSP 115 and/or interchange platform 117. In at least one embodiment, the DSP 115 and/or interchange platform 117 receives the deployment criteria from the OMS 113. In at least one embodiment, the DSP 115 and/or interchange platform 117 is operative to receive one or more identifiers (public, secure, device, or other identifiers) from the Touch Point 123 and provide these identifiers to the OMS 113 (or another system 100 element) for purposes of tracking interactions of the Touch Point 123 with the one or more permitted content elements (and/or the corresponding entity locations thereof).

At step 305, the process 400 includes determining that deployment criteria are satisfied based on the mapping metadata as described herein. According to one embodiment, the DSP 115 and/or the interchange platform 117 performs the processes of determining whether the deployment criteria are satisfied based on the mapping metadata. In at least one embodiment, if the interchange platform 107 determines the deployment criteria to be satisfied, the interchange platform 107 automatically requests a proffer from the DSP 115, the request including the deployment criteria satisfaction indication and one or more of the secure, public, device, content element, and/or device identifiers (e.g., for tracking purposes and for identifying the user and/or particular data associated with the Touch Point 123).

At step 407, the process 400 includes generating and providing a proffer at an interchange platform for publishing permissions to render the one or more content elements on a display of the navigation application 121 on the Touch Point 123. According to one embodiment, the interchange platform 117 is an advertisement exchange platform. In various embodiments, a proffer amount is used to generate the proffer. In at least one embodiment, the proffer amount is included in metadata of the one or more content elements and stored in the content element database 110. In one or more embodiments, if deployment criteria for multiple permitted content elements are satisfied, the system 100 retrieves a proffer amount and generate a proffer for each of the permitted content elements.

In one or more embodiments, the DSP 115 transmits the proffer and proffer amount to the interchange platform 117 that determines whether or not the proffer is successful for purchasing the publishing permissions for the one or more permitted content elements. In at least one embodiment, if the proffer is successful, the process 400 proceeds and includes performing the permitted content element deployment process 600 as described herein. In at least one embodiment, if the proffer is unsuccessful, the process 400 returns to step 303.

Following step 407, the process 400 includes performing a permitted content element deployment process 600 as described herein.

Figure 5:
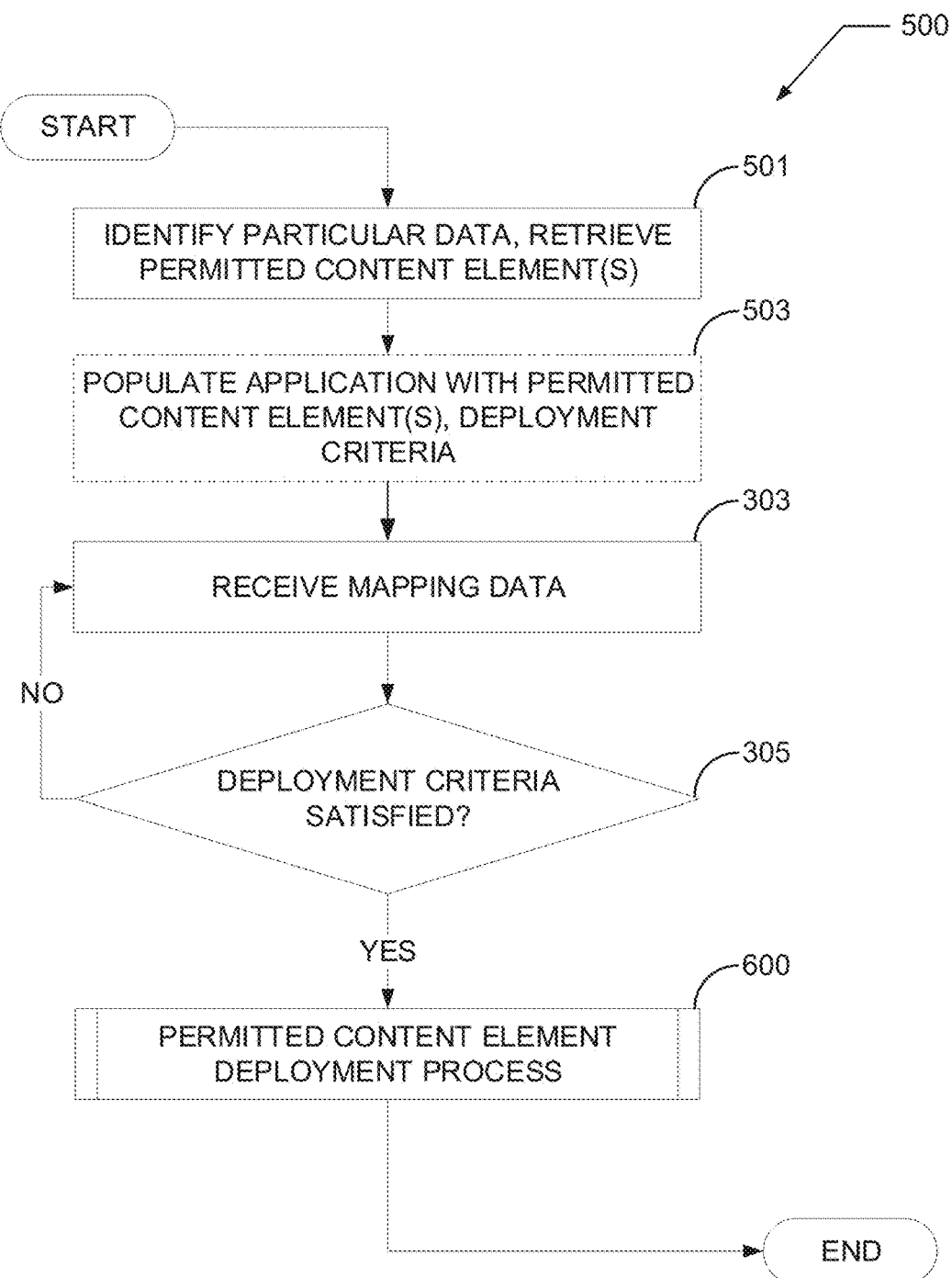
FIG. 5 is a flowchart of an exemplary interactive content transmission process according to one embodiment of the present disclosure.

FIG. 5 shows a flowchart of an exemplary interactive content transmission process 500. As described herein, the process 500 generally refers to a process for transmitting interactive content to a native navigation application 121 in communication with the publisher web server 119.

At step 501, the process 500 includes identifying a user and/or particular data associated therewith and retrieving permitted content elements associated with the user and/or particular data. According to one embodiment, the step 501 is initiated upon launch of a native navigation application 121 on a Touch Point 123.

In various embodiments, the launch of the navigation application 121 causes the Touch Point 123 to establish communications with the OMS 113 and/or the publisher web server 119 via the API 108. In at least one embodiment, the publisher web server 119 requests one or more of a secure identifier, public identifier, and device identifier from the Touch Point 123. In one or more embodiments, the Touch Point 123 transmits the requested identifier(s) to the publisher web server 119 that provides the identifier(s) to the OMS 113. In at least one embodiment, the OMS 113 uses the identifier(s) to identify the user and/or particular data. After identifying the user and/or particular data, the OMS 113 retrieves one or more permitted content elements and corresponding deployment criteria associated with the user or particular data.

According to one embodiment, following the launch, the navigation application 121 requires receipt of a confirmation input before causing the communication with the OMS 113 and the publisher web server 119. For example, upon launch, the navigation application 121 causes the Touch Point 123 to render, on a display, a confirmation window for receiving a confirmation input. In the same example, upon receiving the confirmation input at the confirmation window (e.g., from an input of the user on the Touch Point 123), the navigation application 121 initiates communication with the OMS 113 and the publisher web server 119.

At step 503, the process 500 includes populating the navigation application 121 with the one or more permitted content elements, media, customization data and/or deployment criteria associated therewith. According to one embodiment, step 503 may be omitted, for example, in instances where deployment criteria satisfaction determinations are to be performed by the OMS 113 and/or in instances where the one or more permitted content elements are to be transmitted to the application 121 only upon the deployment criteria being satisfied.

In one or more embodiments, the OMS 113 transmits the one or more permitted content elements and/or the deployment criteria (and associated identifiers thereof) to the navigation application 121 for storage and future processing purposes.

At step 303, the process 500 includes receiving mapping metadata as described herein. According to one embodiment, receipt of the mapping metadata includes the navigation application generating and storing the mapping metadata as described herein.

At step 305, the process 500 includes determining that deployment criteria are satisfied based on the mapping metadata. According to one embodiment, the navigation application 121 performs the processes of determining satisfaction of the deployment criteria described herein. In one or more embodiments, if the navigation application 121 determines that the deployment criteria have been sufficiently satisfied, the process 500 proceeds and includes performing the permitted content element deployment process 600 as described herein. In at least one embodiment, if the navigation application 121 determines that the deployment criteria have not been sufficiently satisfied, the process 500 returns to step 303.

Figure 6:
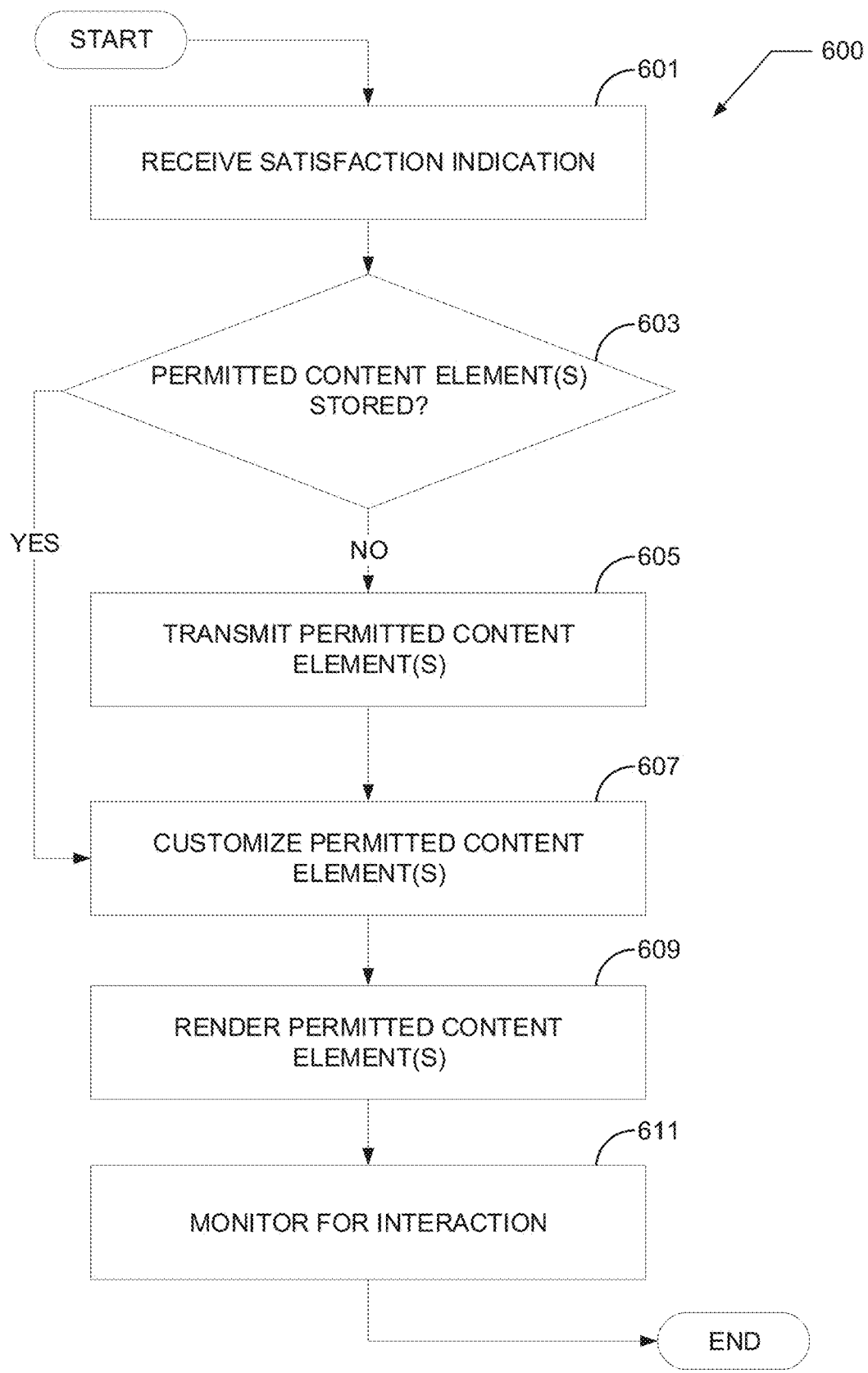
FIG. 6 is a flowchart of an exemplary permitted content element deployment process according to one embodiment of the present disclosure.

With reference to FIG. 6, shown is a flowchart of an exemplary permitted content element deployment process 600.

At step 601, the process 600 includes receiving a deployment criteria satisfaction indication. In one or more embodiments, as described herein, the deployment criteria satisfaction indication is received at one or more of the OMS 113, navigation application 121, DSP 115, interchange platform 117, and other elements of the system 100. In various embodiments, the deployment criteria satisfaction indication is a transmission, signal, or other electronic communication that triggers performance of the process 600. In at least one embodiment, the deployment criteria satisfaction indication includes, but is not limited to, one or more of the secure, public, and device identifiers corresponding to the user and/or particular data associated with the one or more permitted content elements for which deployment criteria have been satisfied.

At step 603, the process 600 includes determining that the one or more permitted content elements are stored in the navigation application 121 or a Touch Point 123 associated with the identifier(s) and the navigation application 121. According to one embodiment, the OMS 113, DSP 115, or interchange platform 117 transmits a request to the navigation application 121 to query itself and/or the Touch Point 123 and determine if the one or more permitted content elements are stored therein. In one or more embodiments, the navigation application 121 determines whether media associated with the one or more permitted content elements is stored therein or in the Touch Point 123. In at least one embodiment, the navigation application 121 provides one or more indications to the OPS 113, DSP 115, or interchange platform 117 indicating: 1) whether or not the one or more permitted content elements are stored; and 2) whether or not the media associated with the one or more permitted content elements are stored.

According to one embodiment, if the system 100 determines that the one or more permitted content elements are stored in the navigation application 121 or Touch Point 123, the process 600 proceeds to step 607. In at least one embodiment, if the system 100 determines that the permitted content elements are not stored, the process 600 proceeds to step 605.

At step 605, the process 600 includes transmitting the one or more permitted content elements (associated with the criteria satisfaction indication and identifier(s) received at step 601) to the navigation application 121. According to one embodiment, the OMS 113 and publisher web server 119 retrieves and transmits the one or more permitted content elements to the navigation application 121 for storage and rendering on the display thereof.

At step 607, the process 600 includes customizing the one or more permitted content elements and/or the media associated therewith. According to one embodiment, at steps 301, 503, 605 or 607, the OMS 113 retrieves or executes a program to generate customization data. In at least one embodiment, the customization data is included in the transmission of the one or more permitted content elements performed at steps 301, 503 or 605. In various embodiments, the customization data include, for example, text strings to be included in renderings of the one or more permitted content elements and/or the media on the display of the navigation application 121. In at least one embodiment, the customization data includes, but is not limited to, one or more of: 1) text strings; 2) audio in a suitable audio file format, such as, for example, .WAV, .PCM, .AIFF, and .MP3; 3) one or more images in a suitable image file format, such as, for example, .PNG, .JPG, .TIFF, and .RAW; 4) one or more videos or animations in suitable animation file format, such as, for example, .GIF, .AVI, and .MP4; 5) coloration data for assigning colors to features of the one or more permitted content elements. In one or more embodiments, the customization data include information from the mapping metadata and/or deployment criteria associated with the one or more permitted content items.

Upon receiving or retrieving the customization data, the navigation application 121 modifies data of the one or more permitted content elements to include the customization data and generate one or more customized content elements. In one example, at step 607, the navigation application 121 modifies a permitted content element "Buy # Get # Free" to a customized content element "Buy 1 Get 2 Free," based on the customization data. In another example, the navigation application modifies a permitted content element "10% Off!" to a customized content element "10% Off Until 5 PM!" based on the customization data and deployment criteria. In another example, the navigation application 121 modifies a permitted content element "15% Off!" to a customized content element "15% Off! You are only 5 Minutes Away!" based on the customization data and mapping metadata.

In some embodiments, the navigation application 121 stores a static or fixed component in a background layer of the display while writing a customized message in an alpha layer on the display. In at least one embodiment, the alpha layer corresponds to a transparent layer rendered over the background layer. For example, the navigation application 121 determines customized content of "You are only 5 Minutes Away!" and the alpha layer based on the customized content. In one or more embodiments, a video is written to the background layer, while the customized content is written to the alpha layer. In some embodiments, a custom filter is applied to the customized content or the background layer. In various embodiments, the customized content is animated. In some embodiments, a video is generated based on the customized content. In at least one embodiment, a processor, such as a graphics processor, merges or rasterizes two or more the layers together when rendering the content to the display.

In at least one embodiment, the customization data may be selectively utilized by navigation application 121 according to one or more temporal parameters or other parameters. For example, the navigation application 121 may determine that a current time is after sunset, and may utilize customization data that causes a feature of the one or more customized content elements to be rendered with a white-colored background. In the same example, the one or more customized content elements may be better distinguished from a darker background color of the display of the navigation application 121.

At step 609, the process 600 includes rendering the one or more permitted (e.g., and, in some embodiments, customized) content elements on the display of the navigation application 121 on the Touch Point 123. According to one embodiment, the navigation application 121 may await receipt of a rendering input to the Touch Point 123 before rendering the one or more permitted content elements. Upon receipt of rendering input selecting the button, the navigation application 121 causes the Touch Point 123 to render the one or more permitted content elements as selectable objects on the display.

According to one embodiment, the navigation application 121 causes the Touch Point 123 to render the one or more permitted content elements as flags or pins. In at least one embodiment, the navigation application 121 renders each of the one or more permitted content elements on the display at a position corresponding to the entity location associated with the permitted content element. For example, the display includes a map and the navigation application 121 displays one or more flags positioned on the map at positions corresponding to the entity location associated with the permitted content element (e.g., with the permitted content element also displayed).

In one example, the navigation application 121 includes a button, or other input field, selection of which causes the navigation application 121 to overlay the one or more permitted content elements onto the display.

According to one embodiment, each of the one or more rendered content elements is selectable via receipt of input on the Touch Point 123. Receipt of input selecting one of the rendered content elements causes the navigation application 121 to perform actions including, but not limited to: 1) launching a dialog window including additional description of the entity, goods, services, and/or other information associated with the rendered content element; 2) launching a selection field for receiving a navigation input, receipt of the navigation input causing the navigation application 121 to automatically update a current pathway to include the entity location associated with the rendered content element.

It will be understood by one of ordinary skill in the art that the steps 601-609, the step 205 of the process 200, and the steps of the process 300, 400, or 500 are performed on a millisecond time-frame, such that there is little or no delay between the system 100 receiving permission for the one or more permissible (then permitted) content elements and rendering the one or more permitted content elements on the display of the navigation application 121.

At step 611, the process 600 includes monitoring for interaction with the one or more rendered, permitted content elements. In various embodiments, the interaction monitoring is performed by one or more of the navigation application 121, OPS 103, OMS 113, and other elements of the system 100. In at least one embodiment, the interaction monitoring includes, but is not limited to: 1) monitoring a current location of the Touch Point 123 to determine if the user associated therewith has accessed the one or more entity locations associated with the one or more permitted content elements; 2) monitoring transactions via the transactional detail system (TDS) 127 to determine if the user has purchased the goods and/or services associated with the one or more permitted content elements; and 3) other monitoring processes, such as for example, monitoring for inputs made to the navigation application 121 selecting any of the one or more permitted content elements.

According to one embodiment, any of the one or more permitted content elements may be de-rendered from the display based on determinations of the interaction monitoring process. A rendered, permitted content element is de-rendered for determinations including, but not limited to: 1) the user has traveled to one of the entity locations (e.g., as detected based on a location of the Touch Point 123 provided in mapping metadata); 2) the user has accessed the goods or services associated with the content element; 3) the deployment criteria associated with the permitted content element becomes unsatisfied (for example, an operational window of an entity location associated with the permitted content element passes, etc.); and 4) the navigation application 121 receives a de-rendering input (e.g., from the system 100, the one or more entities, an operator of the Touch Point 123, etc.).

In one or more embodiments, the interaction monitoring includes transmitting or activating reminders (e.g., stored in metadata of the one or more rendered content elements) for accessing the one or more rendered content elements. Activation of the reminders are temporally, location, or availability-based, or may be a combination thereof. For example, a reminder for a particular rendered content element may become activated when the navigation application 101 (or other system 100 element) determines that the Touch Point 123 is within a predetermined temporal or physical proximity of an entity location associated with the particular rendered content element. In the same example, the reminder may include an electronic notification, push alert, or other indication rendered on the display of the navigation application 121. According to one embodiment, the reminder is transmitted directly to the Touch Point 123 or another application running thereon (e.g., as opposed to being transmitted to the navigation application 121).

In at least one embodiment, the reminder may be a text message, email, or other electronic communication. In one or more embodiments, the reminder is generated by the OMS 113 using identified data corresponding to the user and/or their particular data associated with the one or more rendered content elements. In one example, the OMS 113 processes mapping metadata from the navigation application 121 while the display thereof renders permitted content elements. In the same example, the OMS 113 determines, based on the mapping metadata, that the Touch Point 123 running the navigation application 121 is approaching an entity location associated with one of the rendered content elements. Continuing the same example, the OMS 113 generates and transmits a text message to the Touch Point 123, the text message indicating that the Touch Point 123 is near the entity location. In the same example, a phone number associated with the Touch Point 123 and used for transmitting the text message is retrieved by the OMS 113 from an identified data stored in a secured database thereof. Also, in the same example, the OMS 113 retrieves the identified data (associated with the user and/or their particular data) by indexing the secured database using a device identifier, public identifier, and/or a secure identifier associated with the user and/or particular data.

Conclusion

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the present disclosure is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems (and/or processes) and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes are defined by the appended claims rather than the foregoing description and the exemplary embodiments described therein.

What is claimed is:

1. A process for transmitting interactive content comprising:
    transmitting content to a computing device associated with particular data, the content comprising a call to a beacon service and a secure identifier associated with the particular data;
    generating an association between the secure identifier and at least one public identifier based on the beacon service;
    identifying a subset of a plurality of permissible content elements based on a spend history corresponding to the particular data of an external computing system, wherein each of the plurality of permissible content elements are associated with a respective entity and each respective entity comprises a plurality of respective locations;
    activating at least one permissible content element of the subset of the plurality of permissible content elements and storing the activated at least one permissible content element as at least one permitted content element;
    generating a plurality of deployment criteria associated with the at least one permitted content element based on the plurality of respective locations for the respective entity corresponding to the at least one permitted content element;
    receiving mapping metadata corresponding to an application, the mapping metadata comprising the at least one public identifier and at least one of: an origination location, a plurality of locations along a pathway, and a terminal location;
    determining whether the plurality of deployment criteria are satisfied for the at least one permitted content element based on the mapping metadata; and
    in response to the plurality of deployment criteria being satisfied, causing the at least one permitted content element to be rendered on a display of the application at a position corresponding to one of the plurality of respective locations.

2. The process for transmitting interactive content of claim 1, wherein causing the at least one permitted content element to be rendered on the display of the application comprises causing at least one media object associated with the at least one permitted content element to be rendered on the display.

3. The process for transmitting interactive content of claim 1, further comprising:
    receiving, via the application, an indication that the at least one permitted content element is to be rendered on the display; and
    customizing a rendering of the at least one permitted content element.

4. The process for transmitting interactive content of claim 1, wherein the steps of receiving mapping metadata, determining whether the plurality of deployment criteria are satisfied, and causing the at least one permitted content element to be rendered on the display of the application are performed by the application.

5. The process for transmitting interactive content of claim 4, further comprising populating the application with the at least one permitted content element and the plurality of deployment criteria.

6. The process for transmitting interactive content of claim 1, wherein the steps of receiving mapping metadata, determining whether the plurality of deployment criteria are satisfied, and causing the at least one permitted content element to be rendered on the display of the application are performed by an interchange platform and the process for transmitting interactive content further comprises populating the interchange platform with the at least one permitted content element and the plurality of deployment criteria.

7. The process for transmitting interactive content of claim 1, wherein the at least one of: an origination location, a plurality of locations along a pathway, and a terminating location comprises at least one location associated with a global location system.

8. The process for transmitting interactive content of claim 1, wherein the mapping metadata is received from an interchange platform and causes the at least one permitted content element to be rendered on the display comprises:
    determining a proffer amount based on metadata associated with the at least one permitted content element; and
    in response to receiving the metadata, transmitting a proffer for the proffer amount to the interchange platform.

9. The process for transmitting interactive content of claim 1, wherein determining whether the plurality of deployment criteria are satisfied comprises determining whether at least one of the plurality respective locations for the at least one permitted content element is within a predetermined separation length from the pathway.

10. The process for transmitting interactive content of claim 1, wherein determining whether the plurality of deployment criteria are satisfied comprises determining whether at least one of the plurality respective locations for the at least one permitted content element is within a predetermined detour time from the pathway.

11. The process for transmitting interactive content of claim 1, wherein the external computing system and the application are controlled by a single operator.

12. The process for transmitting interactive content of claim 1, wherein the computing device executes the application.

13. A computer system comprising:
a first portion of a distributed architecture coupled for intercommunication to an external computing system and located behind a firewall, wherein the first portion comprises at least one first computing device that is configured to:
 transmit content to a computing device associated with particular data, the content comprising a call to a beacon service and a secure identifier;
 identify a subset of a plurality of permissible content elements based on a spend history corresponding to the particular data of the external computing system, wherein each of the plurality of permissible content elements are associated with a respective entity and each respective entity comprises a plurality of respective locations; and
 activate at least one permissible content element of the subset of the plurality of permissible content elements and storing the activated at least one permissible content element as at least one permitted content element; and
a second portion of the distributed architecture located outside of the firewall coupled for intercommunication to the first portion of the distributed architecture, wherein the second portion comprises at least one second computing device that is configured to:
 generate an association between the secure identifier and at least one public identifier based on the beacon service;
 generate a plurality of deployment criteria associated with the at least one permitted content element based on the plurality of respective locations for the respective entity corresponding to the at least one permitted content element;
 receive mapping metadata from an application comprising the at least one public identifier, the mapping metadata comprising at least one of: an origination location, a plurality of locations along a pathway, and a terminating location;
 verify that the plurality of deployment criteria are satisfied for the at least one permitted content element based on the mapping metadata; and
 in response to the plurality of deployment criteria being satisfied, cause the at least one permitted content element to be rendered on a display of the application at a position corresponding to one of the plurality of respective locations.

14. The computer system of claim 13, wherein the at least one second computing device is further configured to verify that the plurality of deployment criteria are satisfied for the at least one permitted content element further based on correlating a current time to scheduling data of the respective entity corresponding to the at least one permitted content element.

15. The computer system of claim 13, wherein the plurality of deployment criteria comprises at least one of: a time span, a set of particular days, a geofence, and a weather condition.

16. A system for transmitting interactive content comprising:
a data store comprising data describing:
 a plurality of permitted content elements associated with a secure identifier, wherein the secured identifier corresponds to particular data; and
 a respective entity for each of the plurality of permitted content elements, wherein each respective entity comprises a plurality of respective locations; and
at least one computing device in communication with the data store, the at least one computing device being configured to:
 generate an association between the secure identifier and at least one public identifier;
 generate a plurality of deployment criteria associated with the plurality of permitted content elements based on the plurality of respective locations for the respective entity;
 receive mapping metadata and the at least one public identifier, the mapping metadata comprising at least one of: an origination location, a plurality of locations along a pathway, and a terminating location;
 identify the plurality of permitted content elements based on the association between the secured identifier and the at least one public identifier;
 in response to identifying the plurality of permitted content elements, verify that the plurality of deployment criteria are satisfied for at least one of the plurality of permitted content elements based on the mapping metadata; and
 cause the at least one of the plurality of permitted content elements to be rendered on a display at a position corresponding to one of the plurality of respective locations.

17. The system for transmitting interactive content of claim 16,
wherein the at least one computing device is further configured to:
verify that the at least one of the plurality of permitted content elements was utilized; and
in response to verifying that the at least one of the plurality of permitted content elements was utilized, adjust at least one of the plurality of deployment criteria.

18. The system for transmitting interactive content of claim 16, wherein the at least one computing device is further configured to:
identify an article associated with one of the plurality of permitted content elements; and
verify that the article is available at a particular one of the plurality of respective locations from the respective entity associated with the one of the plurality of permitted content elements; and
cause the at least one of the plurality of permitted content elements to be rendered on the display based on verifying that the article is available.

19. The system for transmitting interactive content of claim 16, wherein the at least one computing device is further configured to:
generate a communication corresponding to the data; and
transform media corresponding to the at least one of the plurality of permitted content elements to be rendered by adding the communication to the media.

20. The system for transmitting interactive content of claim 16, wherein the at least one computing device is further configured to verify that the plurality of deployment criteria are satisfied by determining whether at least one of the plurality respective locations is within a predetermined radius from the origination location.

* * * * *